US012618957B2

(12) United States Patent
    Tiberius et al.

(10) Patent No.: US 12,618,957 B2
(45) Date of Patent: May 5, 2026

(54) TIME OF ARRIVAL ESTIMATION

(71) Applicant: Koninklijke KPN N.V., Rotterdam (NL)

(72) Inventors: Christiaan Christoffel Johan Tiberius, Rotterdam (NL); Gerardus Johannes Maria Janssen, Rotterdam (NL); Jeroen Koelemeij, Rotterdam (NL)

(73) Assignee: Koninklijke KPN N.V., Rotterdam (NL)

( * ) Notice: Subject to any disclaimer, the term of this patent is extended or adjusted under 35 U.S.C. 154(b) by 655 days.

(21) Appl. No.: 17/603,540

(22) PCT Filed: Mar. 27, 2020

(86) PCT No.: PCT/NL2020/050211
    § 371 (c)(1),
    (2) Date: Oct. 13, 2021

(87) PCT Pub. No.: WO2020/214026
    PCT Pub. Date: Oct. 22, 2020

(65) Prior Publication Data
    US 2022/0091278 A1      Mar. 24, 2022

(30) Foreign Application Priority Data
    Apr. 16, 2019    (NL) ..................................... 2022957

(51) Int. Cl.
    *G01S 11/08*            (2006.01)
(52) U.S. Cl.
    CPC ..................................... *G01S 11/08* (2013.01)
(58) Field of Classification Search
    CPC .......... G01S 19/32; G01S 19/22; G01S 19/24;
                 G01S 19/30; G01S 19/37; G01S 11/08;
                 G01S 5/14; G01S 5/145; H04W 56/0055;
                                                H04W 4/029
    See application file for complete search history.

(56) References Cited

U.S. PATENT DOCUMENTS 5,041,833 A * 8/1991 Weinberg .................. G01S 5/14
                                              342/357.48
5,805,108 A * 9/1998 Lennen ................... G01S 19/32
                                              342/357.68
(Continued)

FOREIGN PATENT DOCUMENTS

EP        2 366 115 A1     9/2011
EP        3104195 A1      12/2016

OTHER PUBLICATIONS

Wolf, F. et al., "Coherent Multi-Channel Ranging for Narrowband LPWAN: Simulation and Experimentation Results", 2018 15th Workshop on Positioning, Navigation and Communications (WPNC) (Year: 2018).*

(Continued)

*Primary Examiner* — Cassi J Galt
(74) *Attorney, Agent, or Firm* — Hamilton, Brook, Smith & Reynolds, P.C.

(57)            ABSTRACT

A method is disclosed for determining a signal's time of arrival at a receiver device, the signal being transmitted by a transmitter device to the receiver device. The method comprises correlating the signal as transmitted by the transmitter device and the signal as received by the receiver device with each other. The signal comprises in its frequency spectrum a first signal component spanning a first frequency range, a second signal component spanning a second frequency range and a third signal component spanning a third frequency range. The first frequency range and second frequency range are separated by a first intermediate frequency range that does not contain a signal component of the signal. The second frequency range and third frequency range are separated by a second intermediate frequency range that does not contain a signal component of the signal. The method further comprises, based on the performed correlation, determining said time of arrival.

13 Claims, 20 Drawing Sheets

(56) References Cited

U.S. PATENT DOCUMENTS

| | | | | |
|---|---|---|---|---|
| 9,295,021 | B2 * | 3/2016 | Hedley ................. | H04W 64/00 |
| 2002/0052208 | A1 * | 5/2002 | Porcino ................. | H04W 64/00 |
| | | | | 455/456.6 |
| 2005/0050130 | A1 | 3/2005 | Dabak et al. | |
| 2005/0175075 | A1 | 8/2005 | Martin et al. | |
| 2009/0219201 | A1 | 9/2009 | Martin et al. | |
| 2016/0006500 | A1 * | 1/2016 | Radpour ........... | H04B 7/18539 |
| | | | | 455/427 |

OTHER PUBLICATIONS

International Search Report and Written Opinion for PCT/NL2020/050211, entitled: Time of Arrival Estimation, date of mailing: Jun. 3, 2020.

Issler, Jean-Luc, and Paonni, Matteo, "Toward Centimetric Positioning Thanks for L- and S-Band GNSS and to Meta-GNSS Signals," 2010 5th ESA Workshop on Satellite Navigation Technologies and European Workshop on GNSS Signals and Signal Processing (NAVITEC) (2010).

Paonni, et al., "GNSS Meta-signals: Coherently Composite Processing of Multiple GNSS Signals"; Proceedings of the 27th International Technical Meeting of the Satellite Division of The Institute of Navigation, pp. 2592-2601, (Sep. 2014).

Thomas, Robin, R., et al., "Multiband Time-of-Arrival Positioning Technique for Cognitive Radio Systems," PIMRC 2011 Workshop-Cognitive Radio and Networking, Challenges and Solutions Ahead, pp. 2325-2329 (2011).

* cited by examiner

TIME OF ARRIVAL ESTIMATION

This application is the U.S. National Stage of International Application No. PCT/NL2020/050211, filed Mar. 27, 2020, which designates the U.S., published in English, and claims priority under 35 U.S.C. § 119 or 365(c) to Netherlands Application No. 2022957, filed Apr. 16, 2019. The entire teachings of the above applications are incorporated herein by reference.

FIELD OF THE INVENTION

This disclosure relates to a method for determining a signal's time of arrival at a receiver device, the signal being transmitted by a transmitter device to the receiver device, in particular to such method wherein the signal comprises in its frequency spectrum signal components in disjoint frequency ranges. Further, this disclosure relates to methods for determining said signal, for generating said signal, for transmitting said signal, a transmitter device, a receiver device, the signal itself, a data processing system, a computer program and a system comprising said transmitter device and receiver device.

BACKGROUND

High accuracy time of arrival (ToA) estimation of a signal and the related ranging accuracy, especially in a multipath radio environment, require a high time resolution. Since the achievable time resolution is inversely proportional with the bandwidth of the signal used, accurate ToA estimation requires a (very) large bandwidth signal. Through cross correlation of the received signal with the known transmitted signal, the width of the obtained correlation peak is inversely proportional with the signal's bandwidth. Decimeter accuracy ranging through nanosecond timing accuracy requires a signal bandwidth in the order of a GHz. However, such a wide bandwidth of radio spectrum, in frequency ranges which allow propagation distances of interest for positioning systems, are not freely available and would be extremely expensive, and difficult to arrange.

U.S. 2005/0175075 A1 discloses a satellite position pinpointing receiver intended to carry out combined processing of a first received radio signal and a second received radio signal which differ in frequency.

U.S. 2009/0219201 A1 discloses a satellite positioning receiver having at least one receive channel. Each receive channel is intended to perform a combined processing of a first and a second radiofrequency signals separated in frequency.

WO 2010/062606 A1 discloses techniques for determining time of arrivals of signals in a wireless communication network.

J. Issler, M. Paonni and B. Eissfeller, *"Toward centimetric positioning thanks to L- and S-Band GNSS and to meta-GNSS signals,"* 2010 *5th ESA Workshop on Satellite Navigation Technologies and European Workshop on GNSS Signals and Signal Processing (NAVITEC)*, Noordwijk, 2010, pp. 1-8 as well as Paonni et al; *"GNSS Meta-signals: Coherently Composite Processing of Multiple GNSS Signals"*; Proceedings of the 27th International Technical Meeting of the Satellite Division of The Institute of Navigation (ION GNSS+ 2014), Tampa, Florida, September 2014, pp. 2592-2601 disclose a GNSS Meta-signals concept. Herein, two signals are processed as the two main lobes of a generalized AltBOC signal.

U.S. 2005/0050130 ("U.S. 130") discloses a method for ranging in a multi-band OFDM (Orthogonal Frequency Division Multiplexing) communications system. As known, in OFDM communications systems, numerous closely spaced orthogonal sub-carrier signals in overlapping sub-bands of the spectrum are emitted to carry data. The method of U.S. 130 comprises a first device transmitting a first signal on a first plurality of subbands to a second device and receiving a second signal on a second plurality of subbands from the second device. Based on the first and second signals, a separation is calculated between the first and second device. The method thus uses a plurality of overlapping subbands to transmit ranging signals. Allegedly this would be as opposed to the techniques that were known prior to U.S. 130, which techniques would involve using only one subband to transmit a ranging signal. The use of a plurality of subbands would be advantageous, because herewith the effective bandwidth that is used to transmit ranging signals can be increased resulting in a higher accuracy. A further advantage of this method would be that the number of overlapping subbands that are used for transmitting the ranging signals need not be fixed. Thus, if there are many adjacent subbands available for use, then a large number of subbands can be used, and if only a small number of subbands are available, then only a few subbands are used.

The method of U.S. 130 still leaves room for improving the accuracy with which a separation between two devices can be determined. Therefore, it is an object of the present disclosure to provide a method that allows to determine a time of arrival with a higher accuracy.

SUMMARY

To that end, a method, optionally carried out by a data processing system, is disclosed for determining a signal's time of arrival at a receiver device, the signal being transmitted by a transmitter device to the receiver device. The method comprises correlating the signal as transmitted by the transmitter device and the signal as received by the receiver device with each other. The signal comprises in its frequency spectrum a first signal component spanning a first frequency range and a second signal component spanning a second frequency range. The first frequency range and second frequency range are separated by an intermediate frequency range that does not contain a signal component of the signal. The method further comprises, based on the performed correlation, determining said time of arrival.

The applicants have found that the width of a correlation peak in a correlation signal is directly related to the difference $(f_{max}-f_{min})$ between the lowest frequency $f_{min}$ present in the signal and the highest frequency $f_{max}$ present in the signal. The difference $(f_{max}-f_{min})$ may also be referred to as the virtual bandwidth of the signal and may in principle have any value. Hence, given a certain effective bandwidth, which may be understood to refer to the total bandwidth that the signal occupies, the width of the correlation peak in the correlation signal can be reduced by using one or more intermediate frequency ranges that do not contain signal components of the signal between signal components that do contain signal components of the signal. In this way, $(f_{max}-f_{min})$ is increased, yielding narrower correlation peaks in the correlation signal without increasing the effective bandwidth of the signal. As known, the narrower a peak in a correlation signal, the more accurately a time of arrival can be determined.

Correlating a first and a second signal may be understood to comprise determining a measure of similarity of the first and second signal as a function of time displacement of the first signal relative to the second signal. With autocorrelating, the first and second signal are the same signal.

In particular, the applicants have found that the autocorrelation function of the ranging signal as used herein has a narrow central peak at zero time displacement. Herein, "narrow" may be understood as that the central peak of the ranging signal's autocorrelation function is substantially as wide as a central peak would be of an autocorrelation function of a further signal occupying the entire frequency range ($f_{max}$–$f_{min}$), wherein $f_{max}$ indicates the highest frequency present in the ranging signal and $f_{min}$ indicates the lowest frequency present in the ranging signal.

The ranging signal may be such that the side peaks of its autocorrelation function, which may be understood to be the peaks in the autocorrelation function at nonzero time displacement, have a maximum height that is lower than 0.9 times the height of the autocorrelation function's central peak at zero time displacement, preferably lower than 0.8 times this height, more preferably lower than 0.7 times this height, most preferably lower than 0.6 times this height. To this end, the ranging signal may have been determined according to methods for determining a ranging signal as described herein.

Multiple frequency ranges are, or can be made, available at different locations in the frequency spectrum from for example 1-20 GHz. These frequency ranges may be available on a permanent basis or on a temporary basis and can then be used opportunistically, or they are part of a single licensed communications system, e.g. the mobile communications system.

A frequency range not containing a signal component of the signal may be understood as that the signal does not occupy that frequency range and/or as that the frequency range does not contain a signal component besides unintentionally transmitted spurious components of the signal. The intermediate frequency range may have any size, e.g. 1 MHz, 5 MHz, 100 MHz, et cetera.

It should be appreciated the effective bandwidth of the signal divided by ($f_{max}$–$f_{min}$) may be less than 50%, preferably less than 25%, more preferably less than 15%.

The transmitter device and the receiver device may be the same device or may be part of the same device. In such case, the signal may be transmitted by the device, reflected back to the device by a distant object and subsequently received by the device. If the time of transmission has been accurately registered, the travel time of the signal travelling from the apparatus to the object and from the object back to the apparatus can be determined. This in turn allows to determine the distance between the apparatus and the object.

The first frequency range and/or the second frequency range may in principle span a frequency range of any size, e.g. of at least 1 MHz, preferably at least 10 MHz, more preferably at least 50 MHz. The signal may consist of a combination of a number of relatively narrowband signal components that are distributed over a much wider bandwidth.

The signal may have been determined and/or generated and/or transmitted using any of the methods for these purpose(s) as described herein. Optionally, the method comprises the transmitter device transmitting the signal to the receiver device. Optionally, the method comprises the receiver device receiving the signal from the transmitter device. Optionally, the method comprises the transmitter device determining and/or generating the signal according to methods described herein.

Correlating the signal as transmitted by the transmitter device and the signal as received by the receiver device with each other may comprise correlating a replica of the signal as transmitted with the signal as received. The replica of the signal as transmitted is typically available at the receiver device, because the signal as transmitted by the transmitter device is known at the receiver device.

The signal preferably simultaneously comprises the first and second signal component. The signal may be an electromagnetic signal or another type of signal like an acoustic signal.

Of course, the signal may comprise more than two signal components, such as three, five, ten, a hundred, et cetera. More generally stated, the signal component comprises in its frequency spectrum a plurality of signal components, each signal component spanning a respective frequency range, wherein at least one pair of subsequent frequency ranges is separated by an intermediate frequency range that does not contain a signal component of the signal. Preferably, each pair of subsequent frequency ranges is separated by an intermediate frequency range that does not contain a signal component of the signal.

The methods described herein work with any number of signal components spanning respective frequency ranges that can have any location in the spectrum. In principle, the more signal components the signal comprises, the higher the accuracy of the method. This is explained in more detail with reference to FIGS. 10C and 10D.

In one embodiment, the method comprises, based on the determined time of arrival, determining a distance between the transmitter device and the receiver device, for example by determining a travel time of the signal, which may be understood to be the time period between the transmitter device transmitting the signal and the receiver device receiving the signal, and multiplying the determined travel time with the speed of light.

The method is especially advantageous when a distance is to be determined, e.g. a distance between the transmitter device and the receiver device or, when the transmitter device and the receiver device are embodied in one device, between this device and a distant object. In such a case, typically the signal is received at the receiver device multiple times due to the signal travelling via multiple paths from transmitter device to receiver device. This multi-path effect can easily cause peaks of the correlation function to lie very close to each other herewith causing relatively large uncertainty as to when exactly the signal reached the receiver device for the first time. As will be understood, the narrower the peaks in the correlation function that are associated with the different paths, the better these peaks can be distinguished, hence, the better the peak associated with the first arriving shortest path between transmitter device and receiver device can be distinguished.

In one embodiment, the intermediate frequency range spans at least 5 MHz, more preferably at least 50 MHz, more preferably at least 250 MHz.

In principle, the larger the intermediate frequency ranges, the larger the difference ($f_{max}$–$f_{min}$), which benefits the accuracy of the time of arrival determination. The respective frequency ranges of the signal components may be separated by intermediate frequency ranges. Each intermediate frequency range may span at least 5 MHz. The intermediate frequency ranges need not be of equal size. The intermediate frequency ranges may have any size e.g. at least 5 MHz, more preferably at least 50 MHz, more preferably at least 250 MHz.

In one embodiment, the signal as transmitted comprises a plurality of signal components. The signal components span respective frequency ranges. In this embodiment, the plurality of signal components comprises a lowest frequency signal component comprising the lowest frequency present in the signal $f_{min}$ and a highest frequency signal component comprising the highest frequency $f_{max}$ present in the signal. Further, the lowest frequency range and highest frequency range are separated by a frequency range of $(f_{max}-f_{min})$ at least 50 MHz wide, preferably at least 100 MHz wide, more preferably at least 250 MHz wide, most preferably at least 500 MHz wide. This embodiment allows to determine the time of arrival with very high accuracy.

In one embodiment, the first frequency range has a center frequency $f_{c_1}$ and the second frequency range has a center frequency $f_{c_2}$. In this embodiment, correlating the signal as transmitted and the signal as received with each other comprises a number of steps. One step comprises obtaining a down-converted first signal component as received obtainable by down-converting the first signal component as received over a first frequency shift range, e.g. to baseband, the down-converted first signal component as received having a center frequency $f_{c_1,\downarrow}$. Another step comprises obtaining a down-converted second signal component as received obtainable by down-converting the second signal component as received over a second frequency shift range, e.g. to baseband, the down-converted second signal component as received having a center frequency $f_{c_2,\downarrow}$. Another step comprises correlating the down-converted first signal component as received and a down-converted first signal component as transmitted with each other in order to determine a first correlation signal. The down-converted first signal component as transmitted is obtainable by down-converting the first signal component as transmitted over the first frequency shift range. The first correlation signal has a center frequency $f_{c_1,corr}$. Another step comprises correlating the down-converted second signal component as received and a down-converted second signal component as transmitted with each other in order to determine a second correlation signal. The down-converted second signal component as transmitted is obtainable by down-converting the second signal component as transmitted over the second frequency shift range. The second correlation signal has a center frequency $f_{c_2,corr}$. Another step comprises frequency shifting the first correlation signal. The frequency shifted first correlation signal has a center frequency $f_{c_1,corr,shifted}$. Another step comprises frequency shifting the second correlation signal. The frequency shifted second correlation signal has a center frequency $f_{c_2,corr,shifted}$. The frequency-shifting in this embodiment is performed such that $(f_{c_1,\downarrow}-f_{c_1})+(f_{c_1,corr,shifted}-f_{c_1,corr})=(f_{c_2,\downarrow}-f_{c_2})+(f_{c_2,corr,shifted}-f_{c_2,corr})$. Another step comprises summing the frequency shifted first and second correlation signals.

Optionally, this embodiment comprises down-converting the first signal component as received over the first frequency shift range to obtain the down-converted first signal component as received. Optionally, this embodiment comprises down-converting the second signal component as received over the second frequency shift range to obtain the down-converted second signal component as received. These down-conversion steps may be performed using analog and/or digital components.

This embodiment is advantageous in that the respective correlations are performed at low frequencies, which obviates the need for very fast correlators. It should be appreciated that a down-converting step may be performed in several frequency-shifting sub-steps.

Optionally, in this embodiment, the third frequency range has a center frequency $f_{c_3}$ and the method also comprises obtaining a down-converted third signal component as received obtainable by down-converting the third signal component as received over a third frequency shift range, the down-converted third signal component as received having a center frequency $f_{c_3,\downarrow}$ and comprises correlating the down-converted third signal component as received and a down-converted third signal component as transmitted with each other in order to determine a third correlation signal, wherein the down-converted third signal component as transmitted is obtainable by down-converting the third signal component as transmitted over the third frequency shift range, and the third correlation signal has a center frequency $f_{c_3,corr}$, and comprises frequency shifting the third correlation signal, the frequency shifted third correlation signal having a center frequency $f_{c_3,corr,shifted}$, such that $$(f_{c_1,\downarrow} - f_{c_1}) + (f_{c_1,corr,shifted} - f_{c_1,corr}) =$$
$$(f_{c_2,\downarrow} - f_{c_2}) + (f_{c_2,corr,shifted} - f_{c_2,corr}) =$$
$$(f_{c_3,\downarrow} - f_{c_3}) + (f_{c_3,corr,shifted} - f_{c_3,corr}),$$

and comprises summing the frequency shifted first, second and third correlation signals.

Preferably, this embodiment also comprises providing the signal as received to one or more bandpass filters in order to obtain the first, second and, optionally, third signal components as received separately so that these can be down-converted separately.

More generally stated, in this embodiment, the signal comprises a plurality K of signal components $k=1, \ldots, k=K$. Each signal component k spans a respective frequency range having a center frequency $f_{c_k}$. Each signal component k is then processed similarly as the first and second signal component are processed as per above. In particular, the frequency shifts that are involved in this embodiment satisfy that, for each k, $$(f_{c_k,\downarrow} - f_{c_k}) + (f_{c_k,corr,shifted} - f_{c_k,corr})$$

has the same value.

In one embodiment, the signal as transmitted has a center frequency $f_c$. In this embodiment, $f_{c_1,\downarrow}$ and $f_{c_2,\downarrow}$ and, if present, $f_{c_3,\downarrow}$, are approximately 0 Hz. In an example $$f_{c_1,\downarrow} = f_{c_2,\downarrow} = f_{c_3,\downarrow} = 0 \text{ Hz},$$

and $$f_{c_1,corr,shifted} - f_{c_1,corr} = f_{c_1} - f_c, \text{ and}$$
$$f_{c_2,corr,shifted} - f_{c_2,corr} = f_{c_2} - f_c, \text{ and}$$
$$f_{c_3,corr,shifted} - f_{c_3,corr} = f_{c_3} - f_c.$$

In this embodiment, the first, second and optionally third signal component are down-converted to baseband prior to correlation. More generally, stated, in this embodiment, for each $k^{th}$ signal component, $$f_{c_k,\downarrow} = 0 \text{ Hz and}$$

$$f_{c_k,corr,shifted} - f_{c_k,corr} = f_{c_k} - f_c.$$

In one embodiment, correlating the signal as transmitted by the transmitter device and the signal as received by the receiver device with each other comprises determining a correlation in accordance with $$R_x(\tau) = \sum_{k=1}^{K} R_{x_k^{bb}}(\tau) e^{j2\pi f_{a_k}\tau}.$$

Herein, $$j = \sqrt{-1}.\,\big|$$

Further, the $k^{th}$ signal component of the signal is described by $$\mathrm{Re}\{x_k^{bb}(t) e^{j2\pi f_{c_k} t}\},$$

where $$x_k^{bb}(t)$$

is the $k^{th}$ signal component in baseband. The signal as transmitted is given by $$s_t(t) = \sum_{k=1}^{K} \mathrm{Re}\{x_{k,t}^{bb}(t) e^{j2\pi f_{c_k} t}\}$$

and the signal as received by $$s_r(t) = \sum_{k=1}^{K} \mathrm{Re}\{x_{k,r}^{bb}(t) e^{j2\pi f_{c_k} t}\}.$$

The $k^{th}$ signal component of the signal spans a frequency range having $f_{c_k}$ as center frequency. Further, $$R_{x_k^{bb}}(\tau) = \langle (x_{k,r}^{bb})^*(t)(x_{k,t}^{bb})(t+\tau) \rangle,$$

wherein <.> denotes averaged over time.

$$f_{a_k} = f_{c_k} - f_c,$$

wherein $f_c$ is the center frequency of the signal as transmitted.

One aspect of this disclosure relates to a receiver device comprising means, such as a processor and/or a computer program and/or circuitry, for performing the methods for determining a time of arrival as described herein. This receiver device for example comprises one or more antennas for receiving the signal and/or one or more bandpass filters for filtering the signal as received and/or one or more frequency mixers for frequency-shifting, e.g. down-converting and/or up-converting signal components and/or one or more analog-to-digital converters and/or a data processing system as described herein.

Each of the one or more frequency mixers may be connected to a local oscillator that is configured to generate a reference signal. A frequency mixer may be configured to frequency-shift. e.g. to down-convert and/or up-convert, an incoming signal on the basis of such reference signal.

One aspect of this disclosure relates to a method for determining a ranging signal. This method comprises providing a first ranging signal. The first ranging signal comprises in its frequency spectrum a first signal component spanning a first frequency range and a second signal component spanning a second frequency range. The first frequency range and second frequency range are separated by a first intermediate frequency range that does not contain a signal component of the first ranging signal. The method further comprises autocorrelating the first ranging signal to obtain a first correlation signal. The method further comprises providing a second ranging signal, the second ranging signal comprising in its frequency spectrum a third signal component spanning a third frequency range and a fourth signal component spanning a fourth frequency range. The third frequency range and fourth frequency range are separated by a second intermediate frequency range that does not contain a signal component of the second ranging signal. The method further comprises autocorrelating the second ranging signal to obtain a second correlation signal. The method further comprises based on a comparison between the first correlation signal and second correlation signal, selecting the second ranging signal as ranging signal.

As before, it should be understood that the first and second ranging signals each may comprise any number of signal components, for example at least three signal components, each signal component spanning its own frequency range.

The combination of first frequency range and second frequency range may be different from the combination of the third frequency range and fourth frequency range. Or more generally, the combination of the frequency ranges spanned by the respective signal components in the first ranging signal may be different from the combination of the frequency ranges spanned by the respective signal components of the second ranging signal.

This method for determining a ranging signal is advantageous in that it allows to optimize the autocorrelation properties by iteratively adapting one or more of the frequency ranges spanned by the signal components, which may involve adapting a width of one or more of such frequency ranges and/or adapting the position of such frequency range in the frequency spectrum. By determining the autocorrelation signal for a plurality of candidate ranging signals the best combination of subband signals which results in desirable autocorrelation properties can be determined. A desired property of the autocorrelation signal for example is that it comprises a narrow central peak and/or that side peaks are substantially lower than the central peak in order to ease the detection of the signal upon reception.

It should be appreciated that the step of determining a ranging signal may be performed as part of the generation of the ranging signal. In other words, methods for generating a ranging signal may comprise the above steps for determining the ranging signal.

One aspect of this disclosure relates to a method for generating a ranging signal. The method comprises providing a signal to a first bandpass filter in order to obtain a first bandpass filtered signal component and to a second bandpass filter in order to obtain a second bandpass filtered signal component. The first bandpass filter is configured to pass frequencies within a first bandpass frequency range and the second bandpass filter is configured to pass frequencies within a second bandpass frequency range. The first bandpass frequency range and second bandpass frequency range are non-overlapping. The method comprises combining, e.g. summing, the first and second bandpass filtered signal component in order to generate a combined signal, which combined signal may be the ranging signal.

The provided signal may span a frequency range of at least 50 MHz, preferably at least 100 MHz, more preferably at least 250 MHz, most preferably at least 500 MHz.

The signal may be provided in parallel to the first and second bandpass filter. The first and second bandpass filters may be part of a bank of bandpass filters. The bank of bandpass filters may output a signal having a first signal component output by the first bandpass filter and a second signal component output by the second bandpass filter. Optionally, the method comprises up-converting the signal as output by the bank of bandpass filters.

Preferably, the bandpass filters are zero-phase filters so that any phase relation between the two signal components is maintained.

In one embodiment of this method for generating a ranging signal, the provided signal is a baseband signal. In this embodiment, the method further comprises up-converting the first and second bandpass filtered signal components, for example by up-converting the combined signal.

One aspect of this disclosure relates to a method for generating a signal. This method comprises generating a first baseband signal component and frequency-shifting the first baseband signal component, for example by providing this first baseband signal to a first mixer which is configured to shift the frequency spectrum of the first signal component to a first bandpass frequency range centered at frequency $f_{a1}$ or $f_{c1}$. This method also comprises generating a second baseband signal component and frequency-shifting the second baseband signal component, for example by providing this second baseband signal to a second mixer which is configured to shift the frequency spectrum of the second signal component to a second bandpass frequency range centered at frequency $fa_2$ or $f_{c2}$. The first and second frequency-shifted baseband signal components are separated by an intermediate frequency range. This method further comprises combining, e.g. summing, the frequency shifted first and second baseband signal components to generate a combined signal, which may be the ranging signal. Optionally, this method comprises up-converting the combined signal for generating the ranging signal.

The baseband signals may each span a frequency range of any size, e.g. of at least 10 MHz, preferably at least 20 MHz, more preferably at least 50 MHz.

One aspect of this disclosure relates to a method for transmitting a ranging signal as described herein. This method comprises transmitting the ranging signal. The ranging signal comprises in its frequency spectrum a plurality of signal components, each signal component spanning a respective frequency range, wherein at least one pair of subsequent frequency ranges is separated by an intermediate frequency range that does not contain a signal component of the signal. The ranging signal thus comprises in its frequency spectrum a first signal component spanning a first frequency range and a second signal component spanning a second frequency range. The first frequency range and second frequency range are separated by an intermediate frequency range that does not contain a signal component of the signal.

One aspect of this disclosure relates to a ranging signal as described herein. The ranging signal comprises in its frequency spectrum a plurality of signal components, each signal component spanning a respective frequency range, wherein at least one pair of subsequent frequency ranges is separated by an intermediate frequency range that does not contain a signal component of the signal. The ranging signal thus comprises in its frequency spectrum a first signal component spanning a first frequency range and a second signal component spanning a second frequency range. The first frequency range and second frequency range are separated by an intermediate frequency range that does not contain a signal component of the signal.

One aspect of this disclosure relates to a ranging signal obtainable by one or more of the methods for generating the signal as described herein.

One aspect of this disclosure relates to a transmitter device comprising means for performing the method for determining and/or generating and/or transmitting the signal as described herein. The transmitter device for example comprises a data processing system as described herein and/or one or more frequency coupled local oscillators and/or one or more mixers and/or one or more bandpass filters and/or one or more power amplifiers and/or one or more antennas for transmitting the signal.

One aspect of this disclosure relates to a ranging system comprising a transmitter device as described herein and a receiver device as described herein.

One aspect of this disclosure relates to a computer program comprising instructions which, when the program is executed by a computer cause the computer to carry out the method for determining a time of arrival as described herein, and/or comprising instructions which, when the program is executed by a computer, cause the computer to carry out the method for generating a signal as described herein.

One aspect of this disclosure relates to a computer program comprising instructions which, when the program is executed by a receiver device as described herein, cause such receiver device to carry out the method for determining a time of arrival as described herein, and/or comprising instructions which, when the program is executed by a transmitter device as described herein, cause the transmitter device to carry out the method for generating and/or transmitting a signal as described herein.

One aspect of this disclosure relates to a data processing system comprising means for carrying out the methods for determining a time of arrival and/or for determining a ranging signal and/or for generating a ranging signal as described herein.

One aspect of this disclosure relates to a computer comprising a computer readable storage medium having computer readable program code embodied therewith, and a processor, preferably a microprocessor, coupled to the computer readable storage medium, wherein responsive to executing the computer readable program code, the processor is configured to perform the method for determining a time of arrival and/or for determining a ranging signal and/or for generating a ranging signal as described herein.

One aspect of this disclosure relates to a non-transitory computer-readable storage medium storing at least one software code portion, the software code portion, when executed or processed by a computer, is configured to perform the method for determining a time of arrival and/or for determining a ranging signal and/or for generating a ranging signal as described herein.

One aspect of this disclosure relates to a computer program or suite of computer programs comprising at least one software code portion or a computer program product storing at least one software code portion, the software code portion, when run on a computer system, being configured for executing the method for determining a time of arrival and/or for determining a ranging signal and/or for generating a ranging signal as described herein.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided. A computer program may, for example, be downloaded (updated) to the existing receiver device and/or transmitter device or be stored upon manufacturing of these systems.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1:
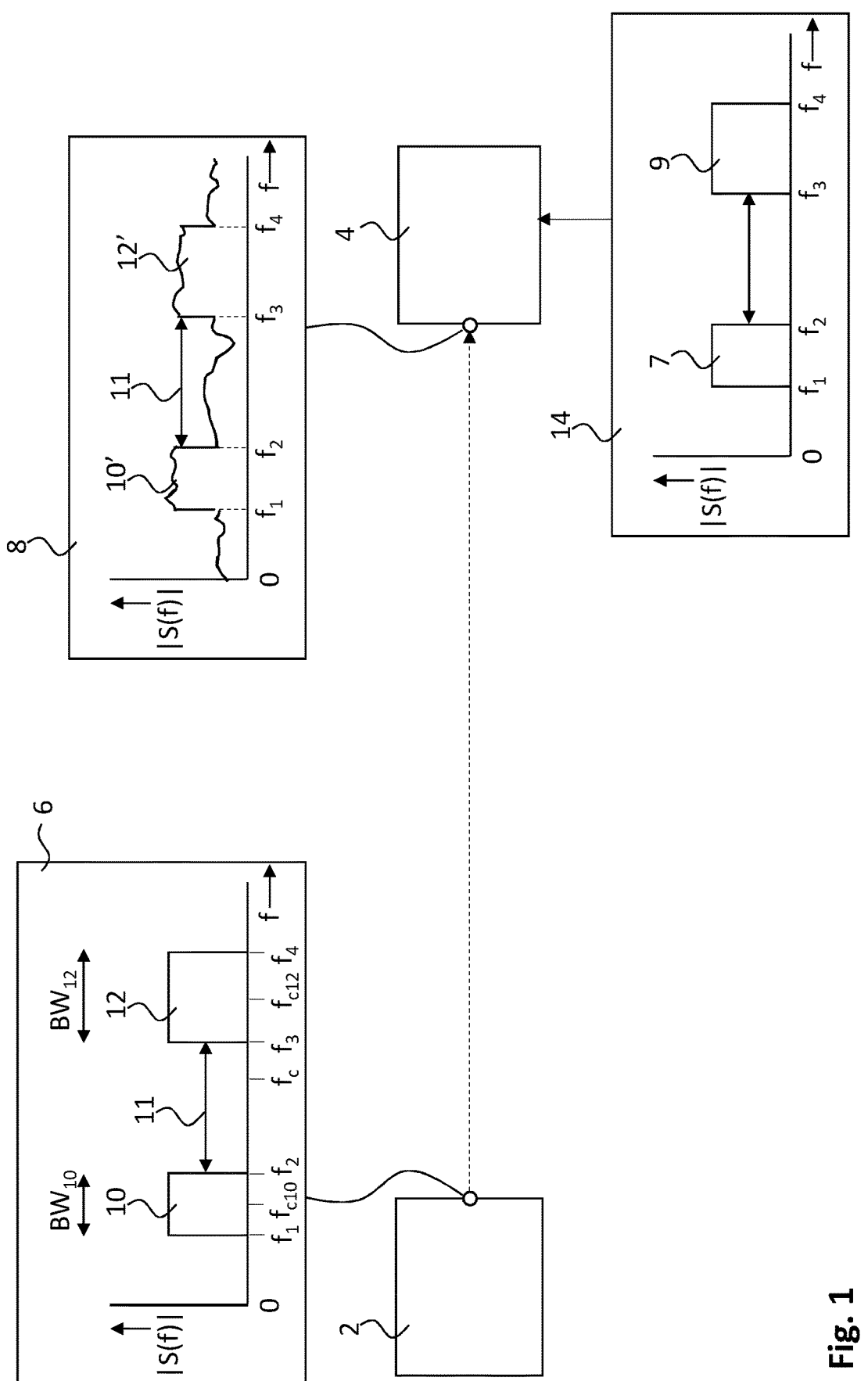
FIG. 1 schematically depicts a transmitter device sending a signal to a receiver device according to an embodiment.

It should be appreciated that identical reference numerals and reference letters in the figures denote similar or identical elements.

FIG. 1 shows a transmitter device 2 and a receiver device 4 that are separated by a certain distance. Transmitter device 2 is configured to transmit a signal 6, also referred to as a ranging signal 6, to receiver device 4. The signal travels during a time period before it arrives at receiver device 4, which is configured to receive the signal. Examples of a receiver device are a positioning device in a mobile phone or a device used for navigation. Examples of a transmitter device are a base station of a mobile communication system a wireless data access point or a satellite. Preferably, the transmitter device 2 and the receiver device 4 each have an internal clock and preferably the internal clock of the transmitter device 2 and the internal clock of the receiver device 4 are synchronized. The methods for synchronizing two internal clocks at distant devices are known in the art and will not be discussed further. If the receiver device 4 is able to accurately determine the time at which the signal arrives at the receiver device, and if the time of the signal's transmission is also accurately known, then the travel time of the signal can be determined.

FIG. 1 shows the frequency spectrum 6 of the signal as transmitted by the transmitter device 2. The signal comprises in its frequency spectrum a first signal component 10 spanning a first frequency range, from $f_1$ to $f_2$, and a second signal component 12 spanning a second frequency range, from $f_3$ to $f_4$. The respective bandwidths of the signal components are indicated by $BW_{10}$ and $BW_{12}$. The first frequency range and second frequency range are separated by an intermediate frequency range 11 that does not contain a signal component of the signal. The first signal component 10 has a center frequency $f_{c10}$ and the second signal component 12 has a center frequency $f_{c12}$.

FIG. 1 also shows the frequency spectrum 8 of the signal as received at the receiver device 4. Typically, the frequency spectrum of the signal as received contains noise. The signal as received comprises the first signal component as received 10' and the second signal component as received 12'.

In order to determine the time of arrival, the signal as transmitted is correlated, optionally by the receiver device 4, with the signal as received. For this correlation, the signal as transmitted is preferably available at the receiver device, for example as a replica 14 of the signal as transmitted. This replica comprises a replica 7 of the first signal component as transmitted and a replica 9 of the second signal component as transmitted. Based on the performed correlation, the time of arrival can be determined.

A signal component of the signal may comprise any type of signal in its frequency range. For example, signal component 10 may comprise a single carrier type of signal, like a BPSK, QPSK or QAM modulated signal or a direct sequence spread spectrum signal and signal component 12 may comprise an OFDM like signal.

Figure 2:
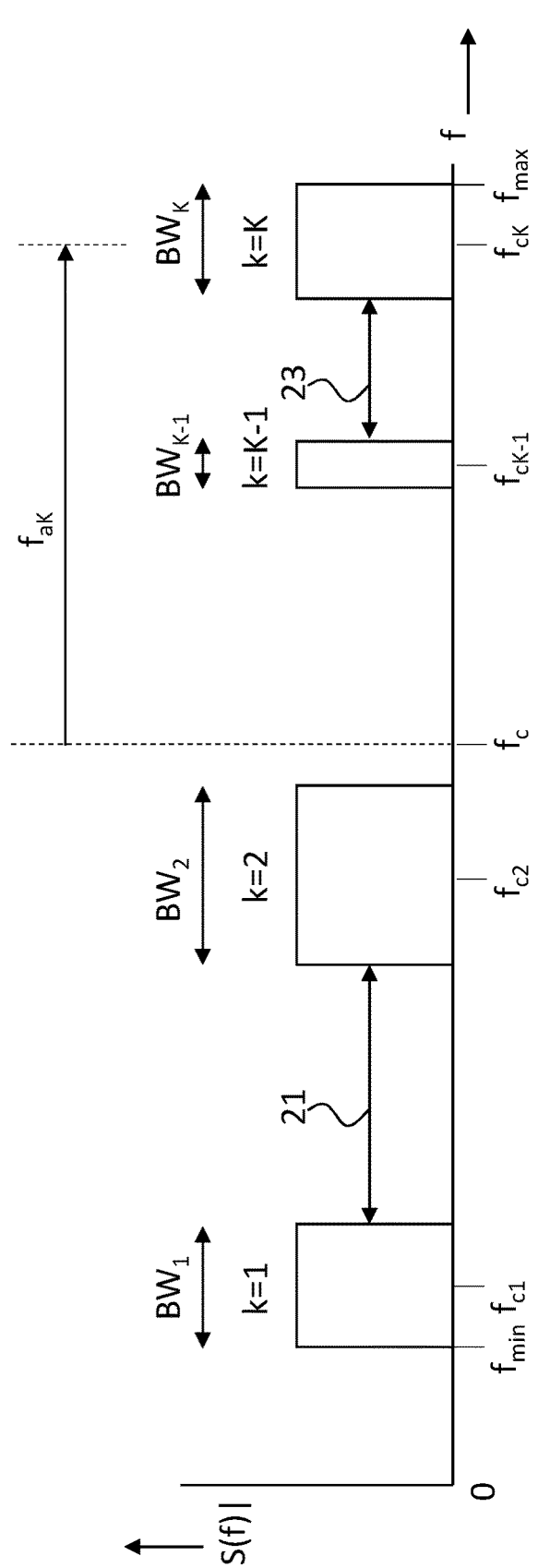
FIG. 2 illustrates a frequency spectrum of a signal according to an embodiment, the signal comprising K signal components.

FIG. 2 shows the frequency spectrum of a signal 6 according to an embodiment in more detail. In particular, FIG. 2 illustrates that the signal 6 may comprise any number of signal components, e.g. at least two, at least three, at least four, at least five, at least ten, at least twenty, at least fifty, at least a hundred signal components. FIG. 2 shows a signal having K signal components. Signal component k=2 may be said to be the subsequent signal component to signal component k=1, because there are no other signal components between them.

Each signal component k is separated from a subsequent signal component k+1 by an intermediate frequency range that does not contain a signal component. FIG. 2 shows intermediate frequency range 21 between signal components k=1 and k=2 and intermediate frequency range 23 between signal components k=K−1 and k=K. Each signal component comprises a center frequency $f_{ck}$. The signal as a whole comprises center frequency $f_c$, which may be defined as ($f_{max}$+$f_{min}$)/2. Further, $f_{ak}$ indicates the frequency difference between the center frequency $f_{ck}$ of a signal component k and center frequency $f_c$ of the signal. Thus, $f_{ak}$=$f_{ck}$-$f_c$.

Figure 3:
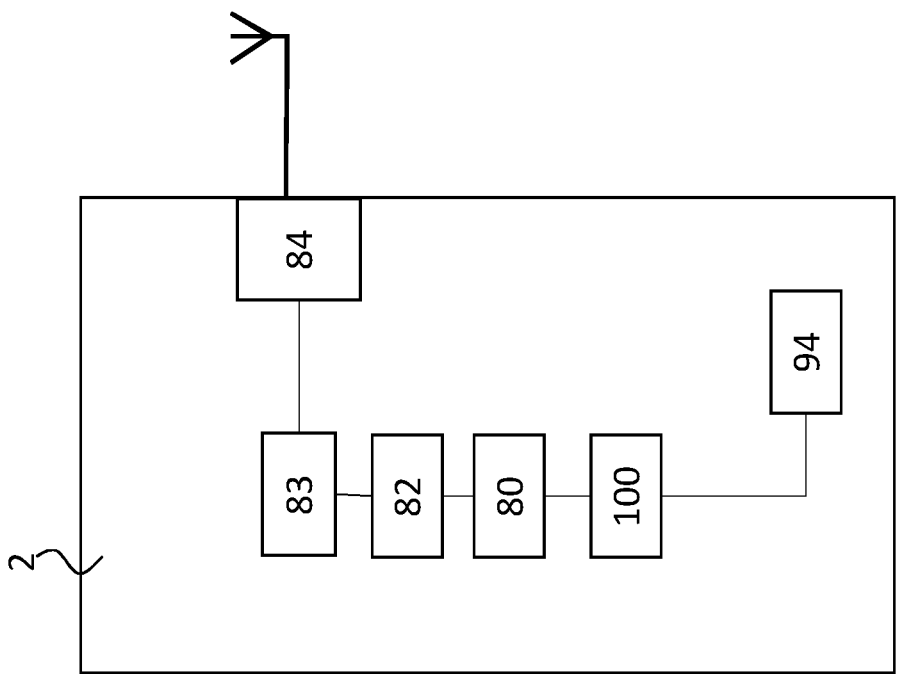
FIG. 3 schematically depicts a transmitter device according to an embodiment.

FIG. 3 schematically shows some components of the transmitter device 2. The transmitter device 2 may comprise a data processing system 100 that will be described in more detail below. The transmitter device may further comprise an internal clock device 94, digital-to-analog converter 80, up-converter 82, power amplifier 83 and antenna system 84. The internal clock device 94 is configured to provide timing information based on which the signal's time of transmission can be determined. The data processing system 100 may be configured to determine and/or generate a signal according to methods described herein. This signal can then be provided to a digital-to-analog converter 80 that converts the digital signal to an analog signal. Subsequently, the analog signal can be processed by the up-converter 82 that optionally comprises a local oscillator device. Up-converting as used herein may be understood to mean frequency-shifting a frequency spectrum of a signal to higher frequencies. The up-converted signal may then be provided to a power amplifier 83 so that the signal as transmitted has sufficient power to reach the receiver device 4. The power amplified signal may then be provided to antenna system 84 that comprises one or more antennas for transmitting the signal to the receiver device 4.

Further, the transmitter device 2 may comprise one or more bandpass filters (not shown). These may be implemented by means of program code (software) in which case the digital processing system 100 may bandpass-filter signals and/or these may be implemented by means of analog circuit components.

Figure 4:
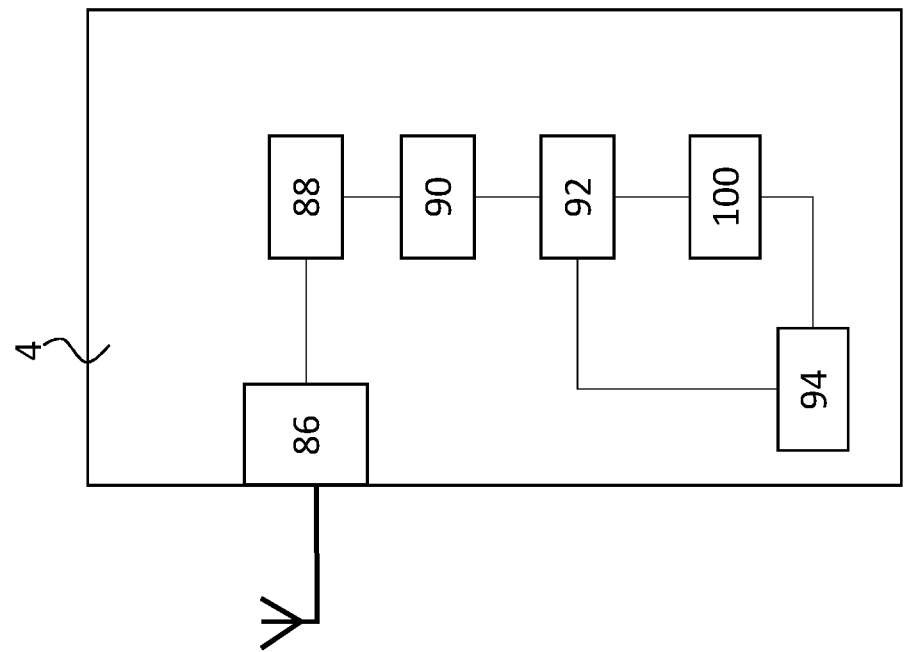
FIG. 4 schematically depicts a receiver device according to an embodiment.

FIG. 4 schematically shows some components of the receiver device 4. The receiver device also comprises a data processing system 100 that will be further explained below, and an internal clock 94. Preferably, the internal clocks of the receiver device 4 respectively transmitter device 2 are synchronized so that the travel time of the signal can be accurately determined. If the time differences are to be determined between respective times of arrival of respective ranging signals that are transmitted to the receiver device by respective transmitter devices then the internal clock 94 of the receiver device need not be synchronized to another external clock.

The receiver device 4 further may comprise an antenna system 86, filter system 88, down-converter 90 and analog-to-digital converter 92. The antenna system 86 comprises one or more antennas for receiving the signal. The received signal may then be fed to a filter system 88 that may be configured to filter out the respective signal components of the signal. Subsequently, the filtered signal is provided to down-converter 90 that is configured to down-convert the filtered signal, e.g. to baseband. A baseband signal (component) may be understood to refer to a signal (component) that spans a frequency range comprising near-zero frequencies. The filtered, down-converted signal may then be provided to an analog-to-digital converter 92 that is configured to convert the analog signal to a digital signal. To this end, the analog-to-digital converter may receive timing information from the internal clock 94. The digital signal may be processed by the data processing system 100. The data processing system 100 may for example be configured to correlate the received digital signal with a digital representation of the signal as transmitted.

Figure 5A:
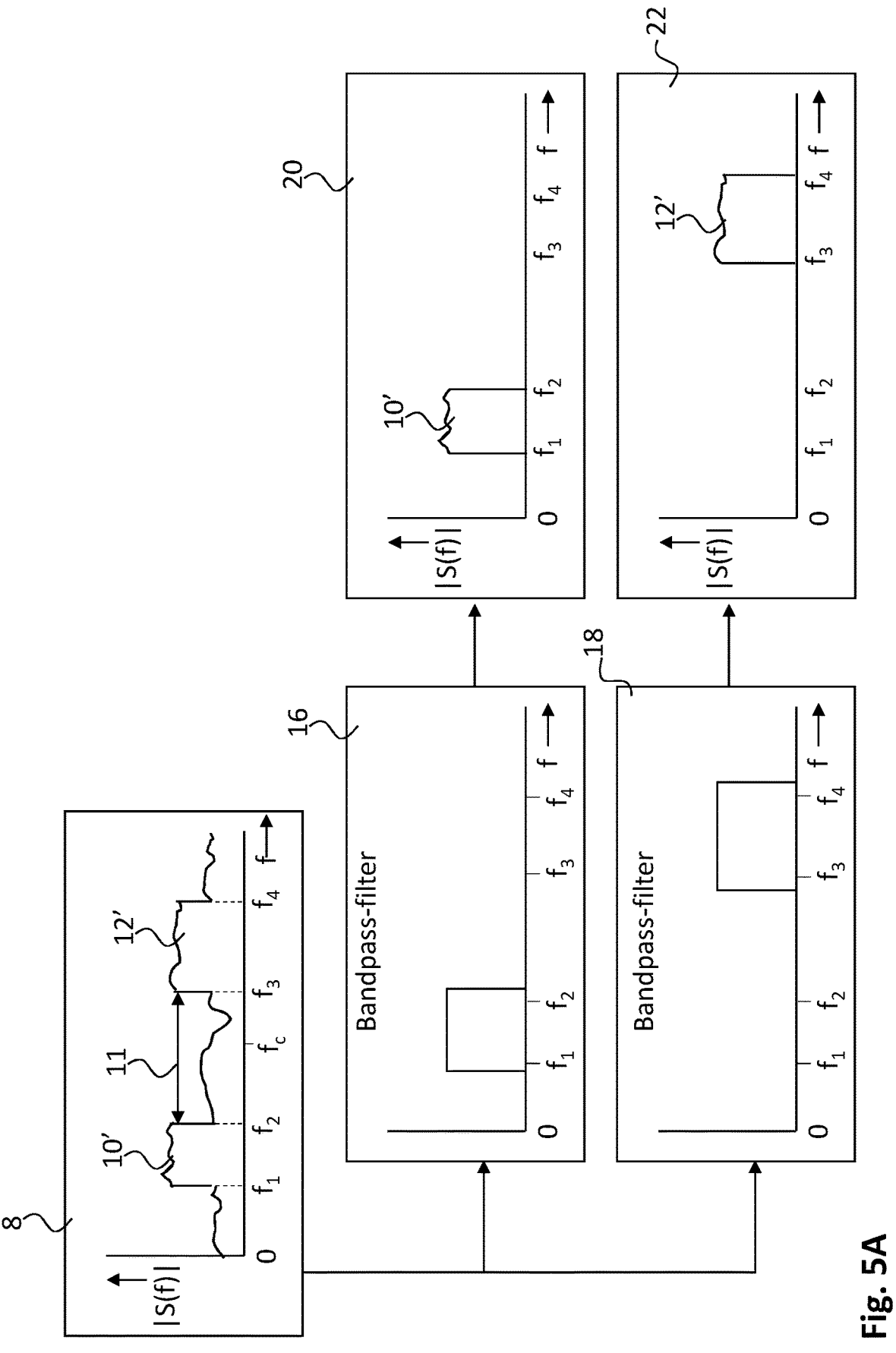
FIGS. 5A, 5B and 5C, 5D illustrate methods for determining a time of arrival according to an embodiment
Figure 5B:
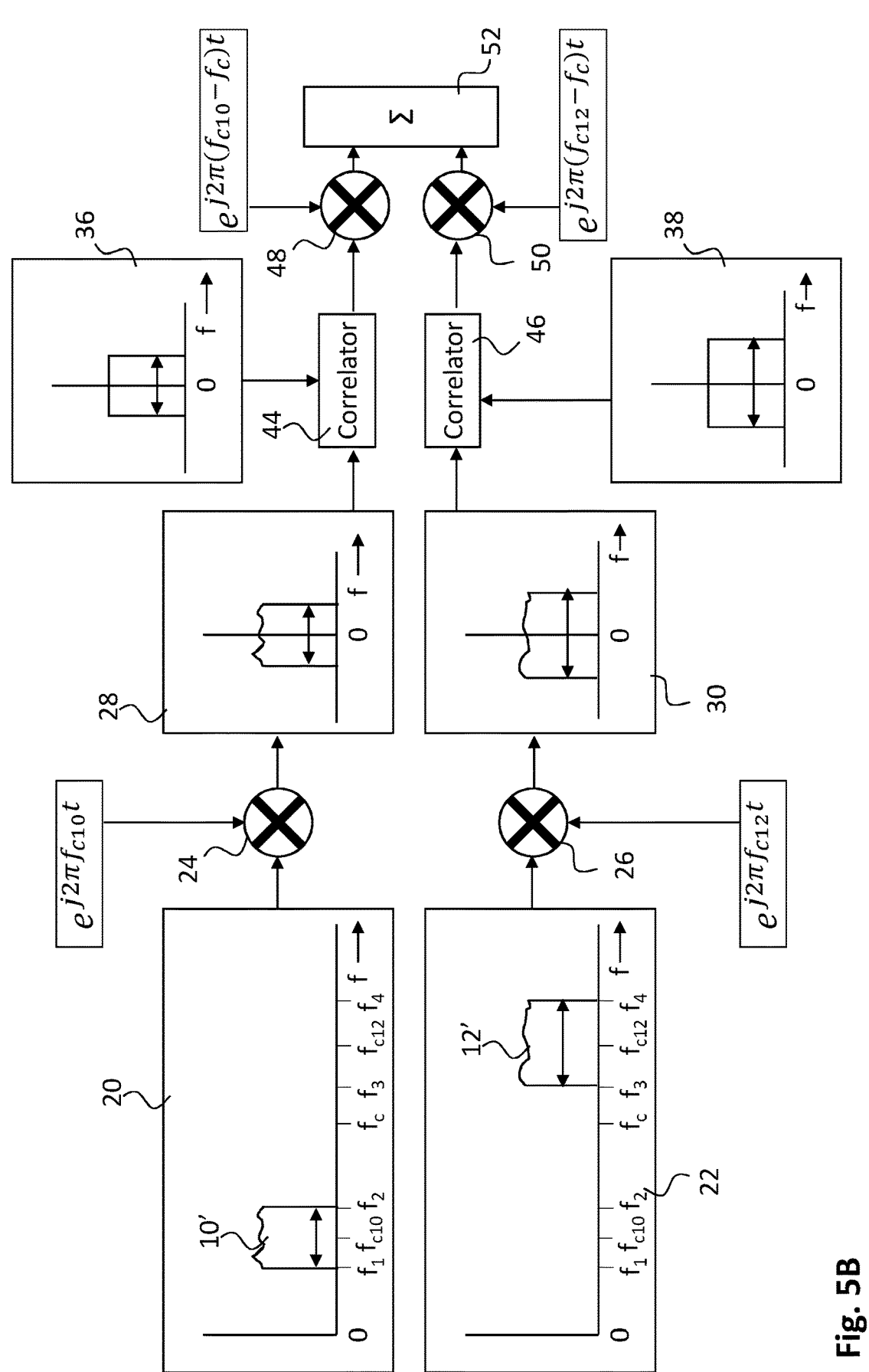

FIGS. 5A and 5B schematically show an embodiment of the method for determining a time of arrival. Herein, the signal as received 8 is fed in parallel to two separate bandpass filters 16 and 18. Bandpass-filter 16 passes frequencies in the range $f_1$ to $f_2$ and bandpass filter 18 passes frequencies in the range $f_3$ to $f_4$. As a result two separate signals are obtained, the frequency spectra 20 and 22 of which are shown.

Filtered signal 20 is then (see FIG. 5B) provided to frequency mixer 24 and filtered signal 22 to frequency mixer 26. In this example, frequency mixer 24 down-converts signal 20 over frequency shift range $f_{c10}$ to baseband in order to obtain baseband signal 28 and frequency mixer 26 down-converts signal 22 over frequency shift range $f_{c12}$ to baseband to obtain baseband signal 30.

Then, signal 28 is correlated with down-converted first signal component as transmitted 36, or a replica thereof, that is obtainable by down-converting the first signal component as transmitted 10 over frequency shift range $f_{c10}$ to baseband. With this down-conversion, the first signal component as transmitted 10 would be frequency shifted over a frequency shift range $f_{c10}$, and a first correlation signal is obtained. Similarly, signal 30 is correlated with down-converted second signal component as transmitted 38, or a replica thereof, that is obtainable by down-converting the second signal component as transmitted 12 over frequency shift range $f_{c12}$ to baseband. With this down-conversion, the second signal component as transmitted 12 would be frequency shifted over a frequency shift range $f_{c12}$ and a second correlation signal is obtained.

Then, the first and second correlation signals are, after frequency conversion by the frequency-mixers 48 and 50, summed in order to determine the correlation signal of the signal as transmitted and the signal as received.

Based on the determined correlation signal, the time of arrival can be determined. This may involve determining that the correlation signal exceeds a threshold value associated with some time instance and determining the time of arrival to be said time instance. Additionally or alternatively, peak finding algorithms known in the art may be used for identifying a peak in the correlation signal and determining the time or arrival based on an identified peak in the correlation signal.

Figure 5C:
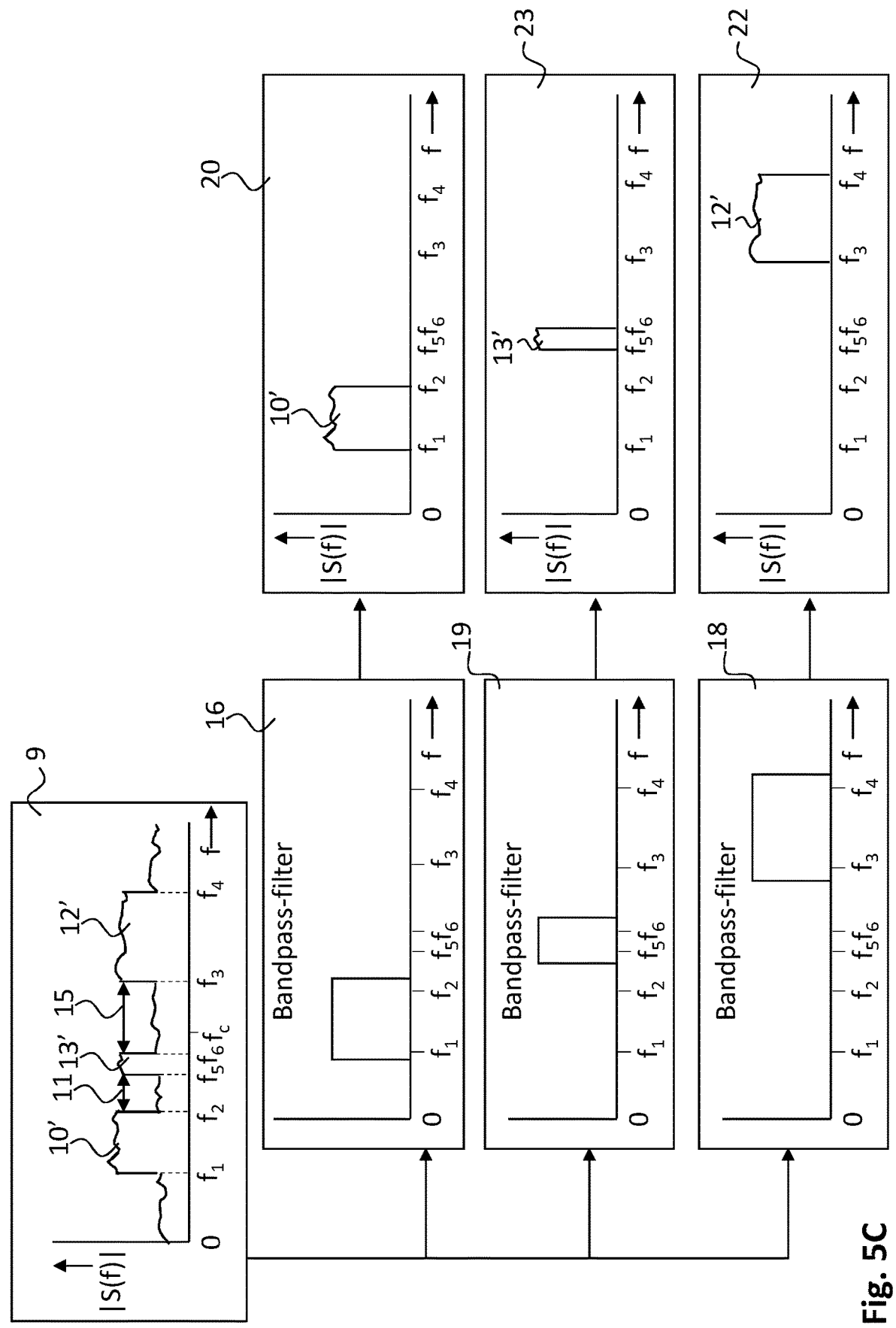
Figure 5D:
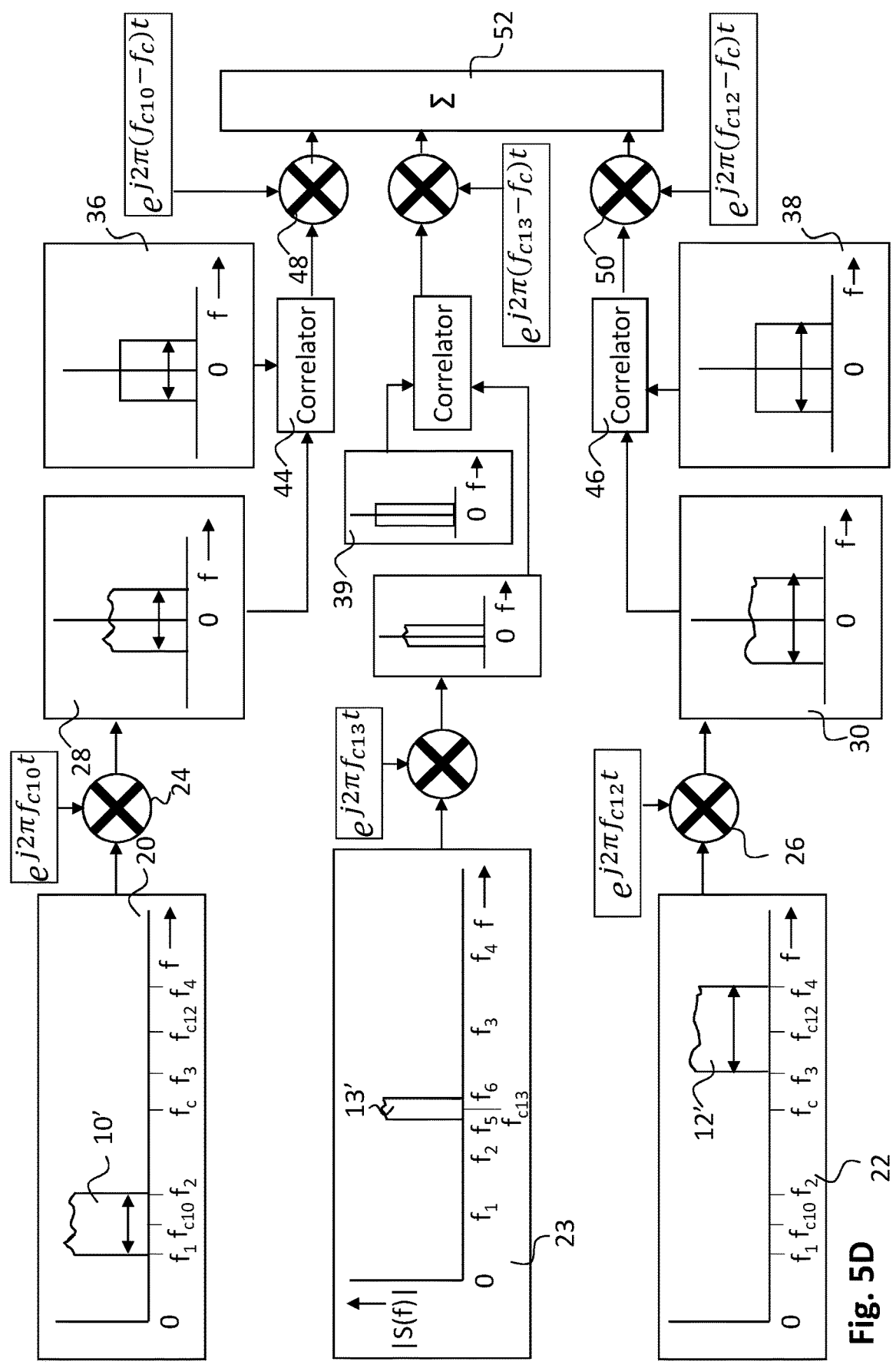

FIGS. 5C and 5D illustrates an embodiment, wherein the signal 9 comprises three signal components 10', 13', and 12' separated by intermediate frequency ranges 11 and 15. This signal is processed similarly as in the embodiment of FIGS. 5A and 5B.

Figure 6A:
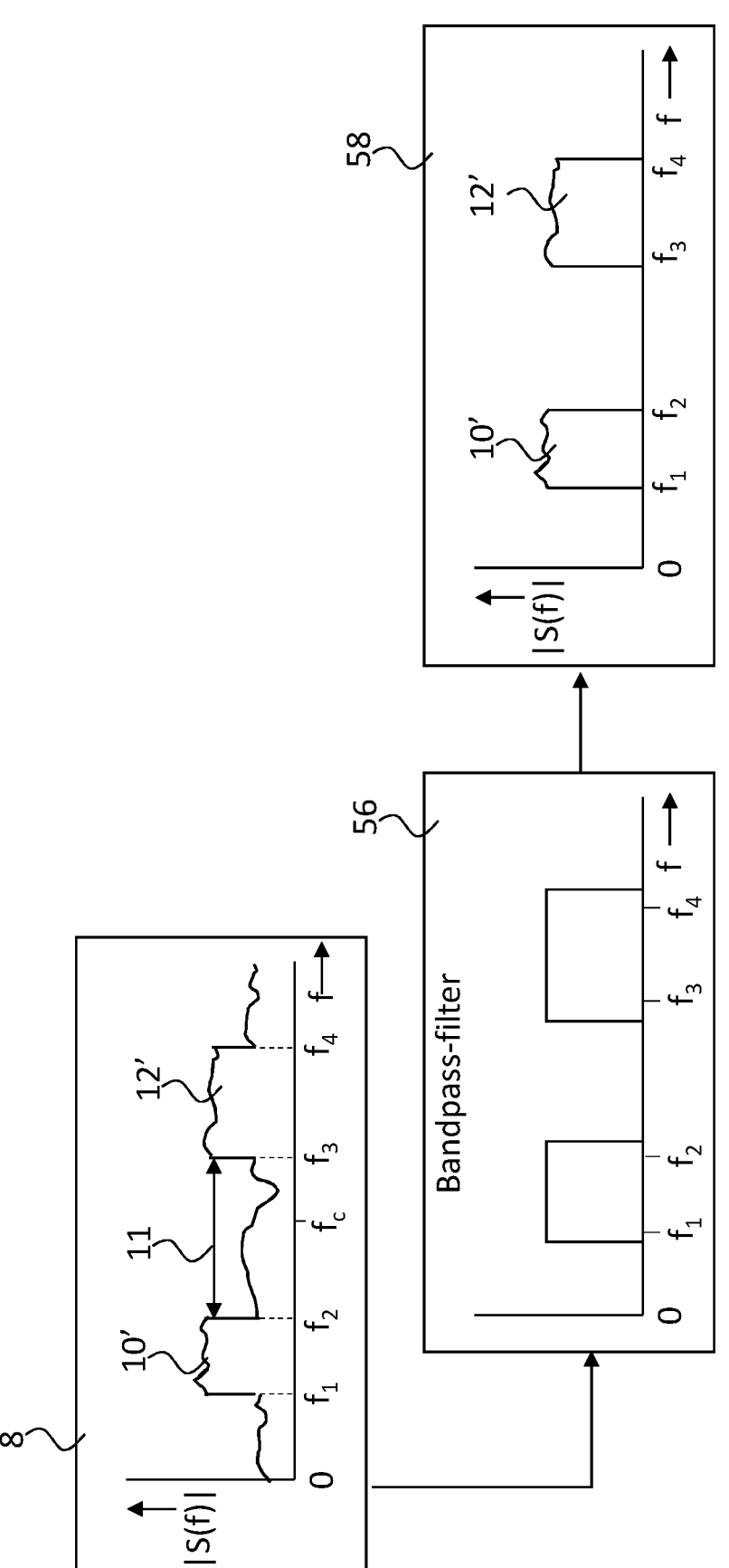
FIGS. 6A and 6B illustrate a method for determining a time of arrival according to a further embodiment.
Figure 6B:
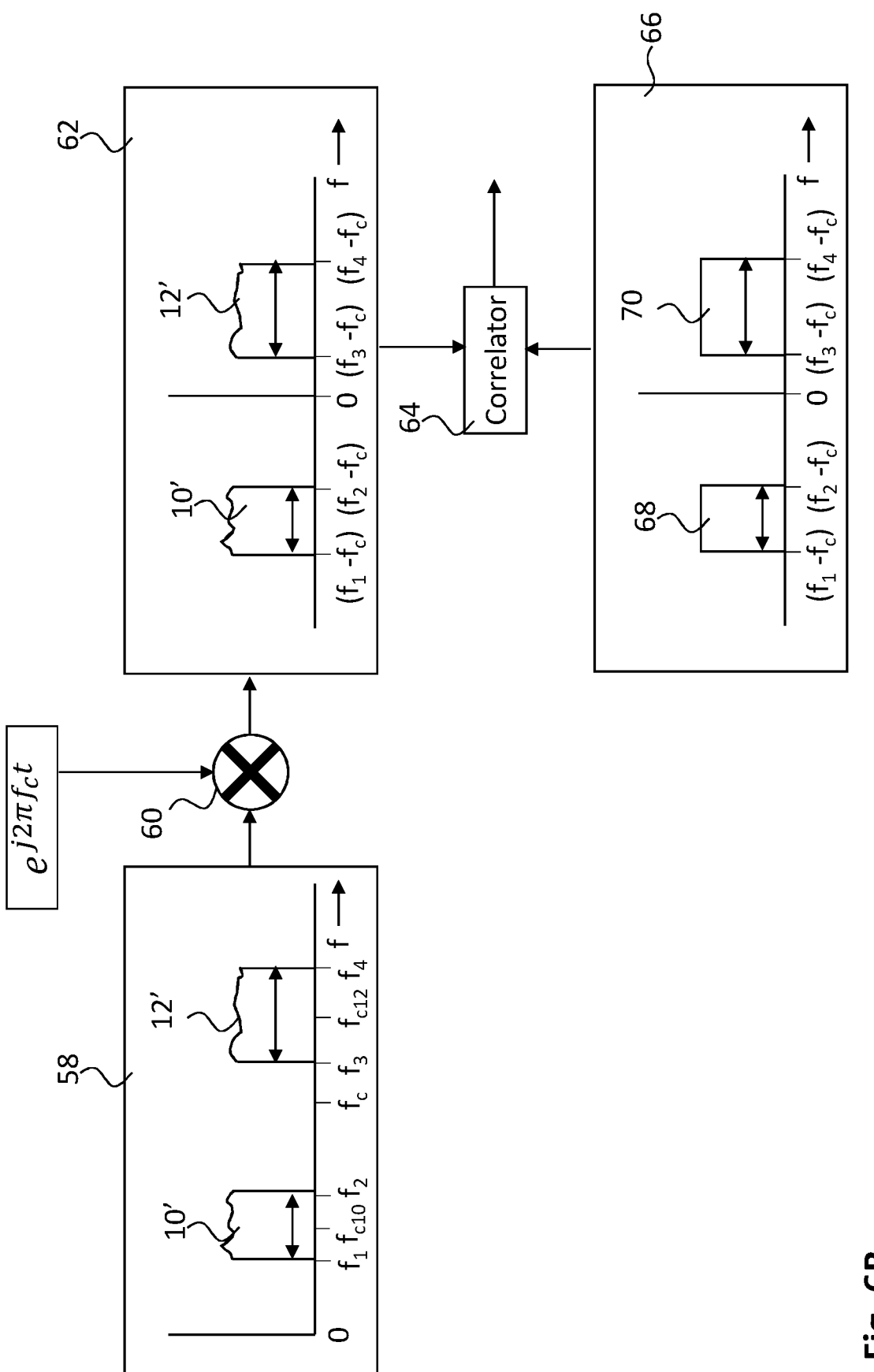

FIGS. 6A and 6B show another embodiment of the method for determining a time of arrival. Again (FIG. 6A), the signal as received 8 is filtered using a filter 56, such as a bank of bandpass filters, in order to obtain a filtered signal 58 as received. Signal 58 as a whole is subsequently (see FIG. 6B) down-converted to baseband using frequency mixer 60 in order to obtain down-converted signal as received 62 comprising down-converted first signal component as received 10' and down-converted second signal component as received 12'. The center frequency of signal 62 in this embodiment is 0 Hz.

The filtered, down-converted signal as received 62 is correlated by correlator 64 with down-converted signal as transmitted 66, or a replica thereof, in order to obtain a correlation signal. Based on the correlation, in particular based on the correlation signal output by correlator 64, the time of arrival can be accurately determined.

Figures 7A, 7B:
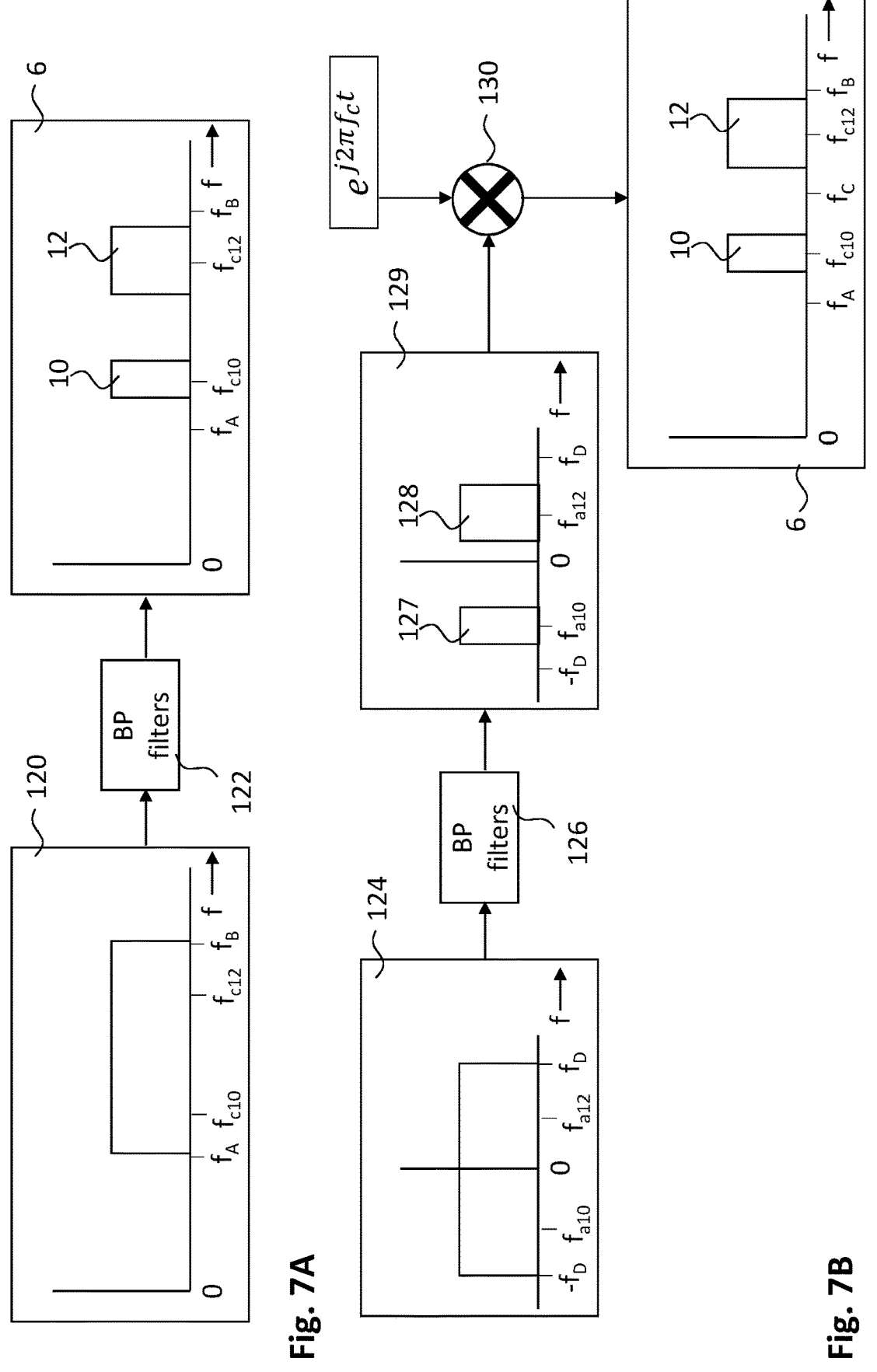
FIGS. 7A-7D illustrate methods for generating a ranging signal according to several embodiments.

FIG. 7A illustrates a method for generating a ranging signal according to an embodiment. In this embodiment, a signal 120 is provided to a bank of bandpass filters 122. The bank of bandpass filters 122 comprises a first bandpass filter 122 in order to obtain a first bandpass filtered signal component 10 and a second bandpass filter in order to obtain a second bandpass filtered signal component 12. The first bandpass filter is configured to pass frequencies within a first bandpass frequency range, e.g. the frequency range $f_1$ to $f_2$ mentioned above, and the second bandpass filter is configured to pass frequencies within a second bandpass frequency range, e.g. the frequency range $f_3$ to $f_4$ mentioned above. The first bandpass frequency range and second bandpass frequency range are non-overlapping. The method comprises combining, e.g. summing, the first and second bandpass filtered signal component in order to obtain a combined signal. The combined signal may be the ranging signal that is to be transmitted.

FIG. 7B illustrates a method for generating a ranging signal according to an embodiment. In this embodiment, a baseband signal 124 is provided to a bank of bandpass filters 126. The bank of bandpass filters comprises a first bandpass filter in order to obtain a first bandpass filtered signal component and to a second bandpass filter in order to obtain a second bandpass filtered signal component. The first bandpass filter is configured to pass frequencies within a first bandpass frequency range, e.g. from $(f_1-f_c)$ to $(f_2-f_c)$ wherein $f_c$ denotes the center frequency of the signal that is going to be transmitted, and the second bandpass filter is configured to pass frequencies within a second bandpass frequency range, e.g. from $(f_3-f_c)$ to $(f_4-f_c)$. The first bandpass frequency range and second bandpass frequency range are non-overlapping. In this embodiment, the method comprises combining, e.g. summing, the first 127 and second 128 bandpass filtered signal component in order to obtain a combined signal 129. In this embodiment, the method further comprises up-converting the first 127 and second 128 bandpass filtered signal components by up-converting the combined signal 129 using frequency mixer 130. Herewith, respective center frequencies ($f_{a10}$, $f_{a12}$) of the bandpass filtered signal components 128 and 128 are frequency-shifted to $f_{c10}$ and $f_{c12}$ respectively.

Figure 7C:
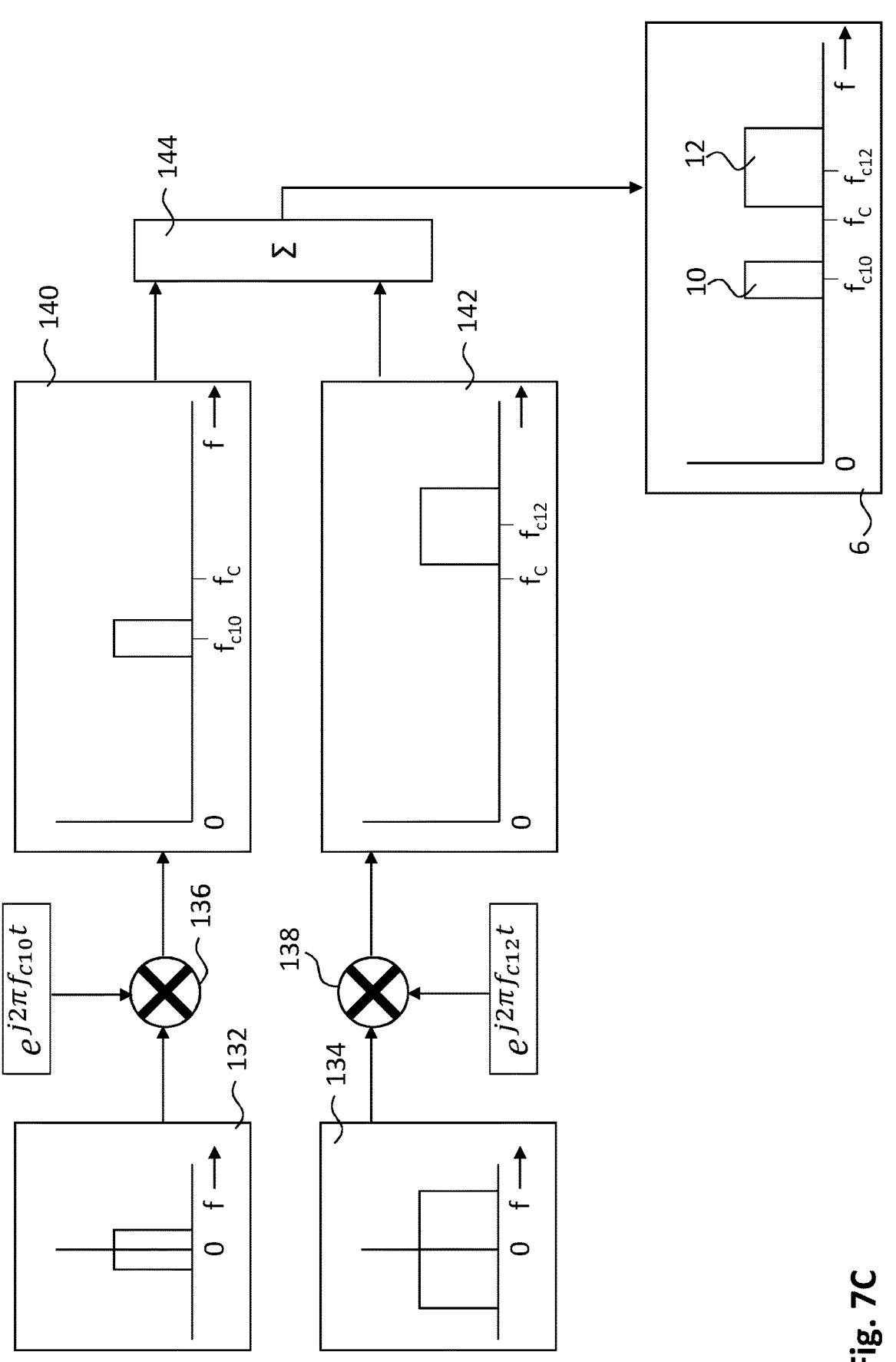

However, the ranging signal 6 may also be generated without using bandpass filters. FIG. 7C illustrates such a method. Herein, a first baseband signal component 132 and second baseband signal component 134 are generated. These are frequency-shifted, e.g. up-converted, using respective frequency mixers 136 and 138 such that the center frequencies of the respective signal components are shifted to $f_{c10}$ and $f_{c12}$, respectively. Herewith, first 140 and second 142 frequency-shifted baseband signal components are obtained. The first 140 and second 142 frequency-shifted baseband signal components span respective frequency ranges that are separated by an intermediate frequency range. Further, this embodiment comprises using a combining device 144 to combine, e.g. sum, the frequency shifted first 140 and second 142 baseband signal components to obtain a combined signal 6, which, in this example, is the ranging signal 6.

Figure 7D:
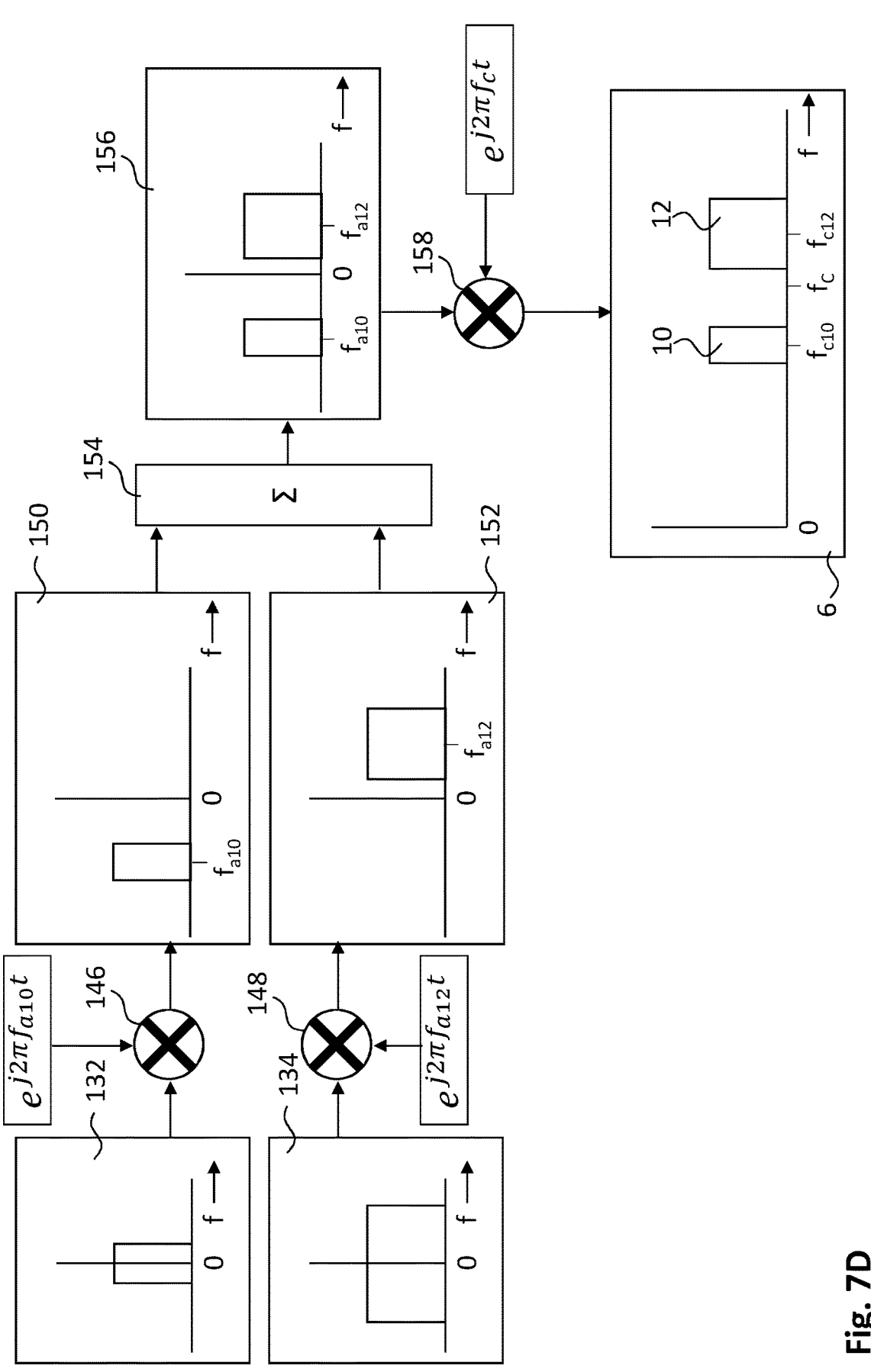

FIG. 7D illustrates an embodiment of the method for generating a ranging signal wherein a first baseband signal component 132 and second baseband signal component 134 are generated. These baseband signal components are subsequently frequency-shifted using respective mixers 146 and 148 such that the center frequencies of the respective signal components are shifted to $f_{a10}$ and $f_{a12}$, respectively. The first 150 and second 152 frequency-shifted baseband signal components span respective frequency ranges that are separated by an intermediate frequency range. These components are then combined, e.g. summed, using combiner 154 in order to obtain a combined signal 156. In this embodiment, the method further comprises up-converting the combined signal 156 using frequency mixer 158 in order to obtain the ranging signal 6.

Thus, instead of using the entire frequency range of a single band (ultra)-wideband signal, only a number of relatively narrow bands may be used to transmit the signal components. These bands, also referred to as frequency ranges, may be spread out over a wide bandwidth or an ultra-wide bandwidth, e.g. $f_{max}-f_{min} \geq 500$ MHz. The individual separated subband signals, also referred to as signal components, may be designed in such a way that they are coherent. When the phase relation between two signal components is known, these two signal components may be said to be coherent signal components. This can be seen as a frequency sparse implementation of an (ultra)-wideband (U)WB signal.

As explained above, there are several ways to generate these subband signals, e.g. as a filtered version of an actual (U)WB signal, or by generating specifically designed (narrowband) signals modulated on multiple frequency and optionally phase related carrier signals. Let the complex equivalent baseband UWB signal be c(t), then the real unfiltered signal transmitted at center frequency $f_c$ is given by $$s(t) = \mathrm{Re}\{c(t)e^{j2\pi f_c t}\}. \qquad (1)$$

with $$j = \sqrt{-1}.$$

The signal c(t) can be some type of UWB signal, e.g. a direct-sequence spread spectrum (DS-SS) signal using a pseudo random spreading code like a maximum length (ML) sequence with a null-to-null bandwidth of $2R_c$ where $R_c$ is the chip rate of the DS-SS modulation. This UWB baseband signal may then be filtered using a number of bandpass filters. A bandpass filter operation with frequency response $H(f-f_a)$ centered at baseband frequency $f_a$ can be modeled as a lowpass filter with impulse response $h(t)=F^{-1}\{H(f)\}$, shifted to frequency $f_a$ as $H(f-f_a)=F\{h(t)e^{j2\pi f_a t}\}$. Here $F\{.\}$ and $F^{-1}\{.\}$ indicate the Fourier Transform and Inverse Fourier Transform, respectively. In case we have access to K frequency bands (in pass-band) with the $k^{th}$ band indicated by its center frequency $f_{c_k}$ and bandwidth $BW_k$, see FIG. 2, we can determine a suitable center frequency as $$f_c = \frac{f_{max} - f_{min}}{2}.$$

In baseband now K lowpass filters can be designed where the $k^{th}$ filter has frequency response $H_k(f)$ and bandwidth $$\frac{BW_k}{2}.$$

The corresponding $k^{th}$ bandpass filter, still in baseband, with frequency response $H_k(f-f_{a_k})$ has a center-frequency of $$f_{a_k} = f_{c_k} - f_c.$$

Now the (U)WB baseband signal c(t) may be filtered with a bank of relatively narrowband filters (in parallel) as follows:

$$X(f) = C(f)\sum\nolimits_{k=1}^{K} H_k(f - f_{a_k}),\tag{2}$$

where $C(f)=F\{c(t)\}$. The time signal $$x(t) = F^{-1}\{X(f)\}\tag{3}$$

consists now of K subbands of the original signal c(t) which are still coherent. In case the filters $H_k(f)$ are taken zero-phase filters, the exact phase relations between the subband signals are maintained. When the periodically transmitted ranging signals are fixed or of a constant set, but unique for each transmitter station, the proper subband signals can be calculated beforehand and stored. Now the transmitted signal can be generated as:

$$s(t) = \mathrm{Re}\{x(t)e^{j2\pi f_c t}\}.\tag{4}$$

An alternative way for generating the signal is to generate the equivalent complex baseband signals $x_k(t)=F^{-1}\{C(f)H_k(f-f_{a_k}\}$ and create the multiple subband signal by summing the modulated signals as:

$$s(t) = \sum\nolimits_{k=1}^{K} \mathrm{Re}\{x(t)e^{j2\pi f_c t}\}.\tag{5}$$

Generating and processing an (U)WB signal in baseband will require extremely high sample rates and computational power. Instead of filtering an UWB signal in baseband and modulate the filtered signal to a center frequency $f_c$, it is also possible to create the individual subband equivalent baseband signals $$x_k^{bb}(t),$$

with its spectrum centered at f=0, for the subband signal $$x_k(t) = x_k^{bb}(t)e^{j2\pi f_{a_k} t},$$

as:

$$x_k^{bb}(t) = F^{-1}\{C(f + f_{a_k})H_k(f)\},\tag{6}$$

and generate the transmitted signal s(t) as:

$$s(t) = \sum\nolimits_{k=1}^{K} \mathrm{Re}\{x_{k,t}^{bb}(t)e^{j2\pi f_c t}\}\tag{7}$$

With this approach, K individual modulators are needed and preferably the carrier frequencies at $f_{c_k}=f_c+f_{a_k}$ and their frequencies are related (frequency locked oscillator signals).

Below, the auto-correlation of the multiple subband signals is analyzed and it is shown that the width of the overall correlation peak is inversely related to $(f_{max}-f_{min})$. Further, it is shown that the auto-correlation of the resulting multiple subband signal can be written as the sum of the auto-correlations of the individual complex equivalent baseband signals of these subband signals. Note that in practice the cross-correlation of the received signal and an ideal replica of the transmitted signal, available at the receiver device, will be determined.

For the complex subband time signal $$x(t) = \sum\nolimits_{k=1}^{K} x_k(t),$$

its amplitude spectral density is given by the truncated Fourier transform $$\overline{X}(f) = \overline{F}\{x(t)\} = \lim_{T\to\infty} \frac{1}{\sqrt{T}} \int_{-\frac{T}{2}}^{\frac{T}{2}} x(t)e^{-2\pi j f} df,$$

and its power spectral density (PSD) is given by $$P_x(f) = \overline{X}(f)\overline{X}^*(f) = |\overline{X}(f)|^2.$$

By definition the auto-correlation function of the complex baseband signal x(t) is equal to $$R_x(\tau) = \langle x^*(t)x(t+\tau)\rangle = F^{-1}\{P_x(f)\},\tag{8}$$

where <.> denotes averaged over time. Note that $R_x(T)$ in general is complex, i.e. when the PSD is asymmetric in f=0. Since we can write x(t) as $$x(t) = c(t) * \sum_{k=1}^{K} h_k(t)e^{j2\pi f_{a_k} t},\tag{9}$$

in which $$h_k(t)e^{j2\pi f_{a_k} t}$$

is the impulse response of the $k^{th}$ bandpass filter centered at $f_{a_k}$, we can write X(f) as in (2) and therefore $$P_x(f) = |\overline{X}(f)|^2 = |\overline{C}(f)\sum\nolimits_{k=1}^{K} H_k(f - f_{a_k})|^2\tag{10}$$

-continued $$= \left[ \overline{C}(f) \sum_{k=1}^{K} H_k(f - f_{a_k}) \right] \left[ \overline{C}(f) \sum_{l=1}^{K} H_l(f - f_{a_l}) \right]^*$$

$$= |\overline{C}(f)|^2 \sum_{k=1}^{K} \sum_{l=1}^{K} H_k(f - f_{a_k}) H_l^*(f - f_{a_l}),$$

Now under the assumption that $H_k(f-f_{a_k})$ is bandlimited and $H_k(f-f_{a_k})H_l(f-f_{a_l})=0 \forall f$ and $k \neq l$, i.e. $H_k(f-f_{a_k})$ with $k \in 1, \ldots, K$ are non-overlapping (which is a valid approximation in practice), then $$P_x(f) = |\overline{X}(f)|^2 \tag{11}$$

$$= |\overline{C}(f)|^2 \sum_{k=1}^{K} |H_k(f - f_{a_k})|^2$$

$$= \sum_{k=1}^{K} |\overline{X}_k(f)|^2,$$

with $|\overline{X}_k(f)|^2 = |\overline{C}(f)|^2 |H_k(f-f_{a_k})|^2 = P_{x_k}(f)$, the PSD of the $k^{th}$ subband in baseband. Since $R_x(\tau)=F^{-1}\{P_x(f)\}=F^{-1}\{|\overline{X}(f)|^2\}$, we find $$R_x(\tau) = F^{-1}\left\{ |\overline{C}(f)|^2 \sum_{k=1}^{K} |H_k(f - f_{a_k})|^2 \right\} \tag{12}$$

$$= F^{-1}\left\{ \sum_{k=1}^{K} |\overline{X}_k(f)|^2 \right\}$$

$$= \sum_{k=1}^{K} F^{-1}\{P_{x_k}(f)\} = \sum_{k=1}^{K} R_{x_k}(\tau).$$

Thus the resulting auto-correlation function of an (U)WB signal consisting of a number of rather narrowband, but disjoint subbands can be written as the sum of the respective autocorrelation functions of the individual subband signals.

Let the subband signal $x_k(t)$ with amplitude spectral density $\overline{X}_k(f)$ be centered at frequency $f=f_{a_k}$. Then its auto-correlation function can be expressed in the autocorrelation function of its complex equivalent baseband signal $$x_k^{bb}(t)$$

which is centered at $f=0$. Since we can write $x_k(t)$ as $$x_k(t) = x_k^{bb}(t) e^{j2\pi f_{a_k} t} \tag{13}$$

it follows for the autocorrelation function of $x_k(t)$ $$R_{x_k}(\tau) = \langle x_k^*(t) x_k(t + \tau) \rangle \tag{14}$$

$$= \langle (x_k^{bb})^*(t) e^{-j2\pi f_{a_k} t} x_k^{bb}(t + \tau) e^{j2\pi f_{a_k}(t+\tau)} \rangle$$

$$= \langle (x_k^{bb})^*(t) x_k^{bb}(t + \tau) e^{j2\pi f_{a_k} \tau} \rangle$$

$$= \langle (x_k^{bb})^*(t) x_k^{bb}(t + \tau) \rangle e^{j2\pi f_{a_k} \tau}$$

$$= R_{x_k^{bb}}(\tau) e^{j2\pi f_{a_k} \tau},$$

and we can write for $R_x(\tau)$:

$$R_x(\tau) = \sum_{k=1}^{K} R_{x_k}(\tau) \tag{15}$$

-continued $$= \sum_{k=1}^{K} R_{x_k^{bb}}(\tau) e^{j2\pi f_{a_k} \tau}.$$

So when the equivalent baseband signals $$x_k^{bb}(t)$$

are known, their autocorrelation functions $$R_{x_k^{bb}}(\tau)$$

can be determined, and next, the overall autocorrelation function $R_x(\tau)$ of $x(t)$. This may provide also a tool to optimize the autocorrelation function for ranging and positioning, namely to find the best combination of subband signals which results in desirable autocorrelation properties. These subband signals may not necessarily be related to, or derived from an (U)WB signal. In case these subband signals are received with separate front-ends and detectors, tuned to specific subbands, then accurate carrier frequency relations are preferred.

Figure 8:
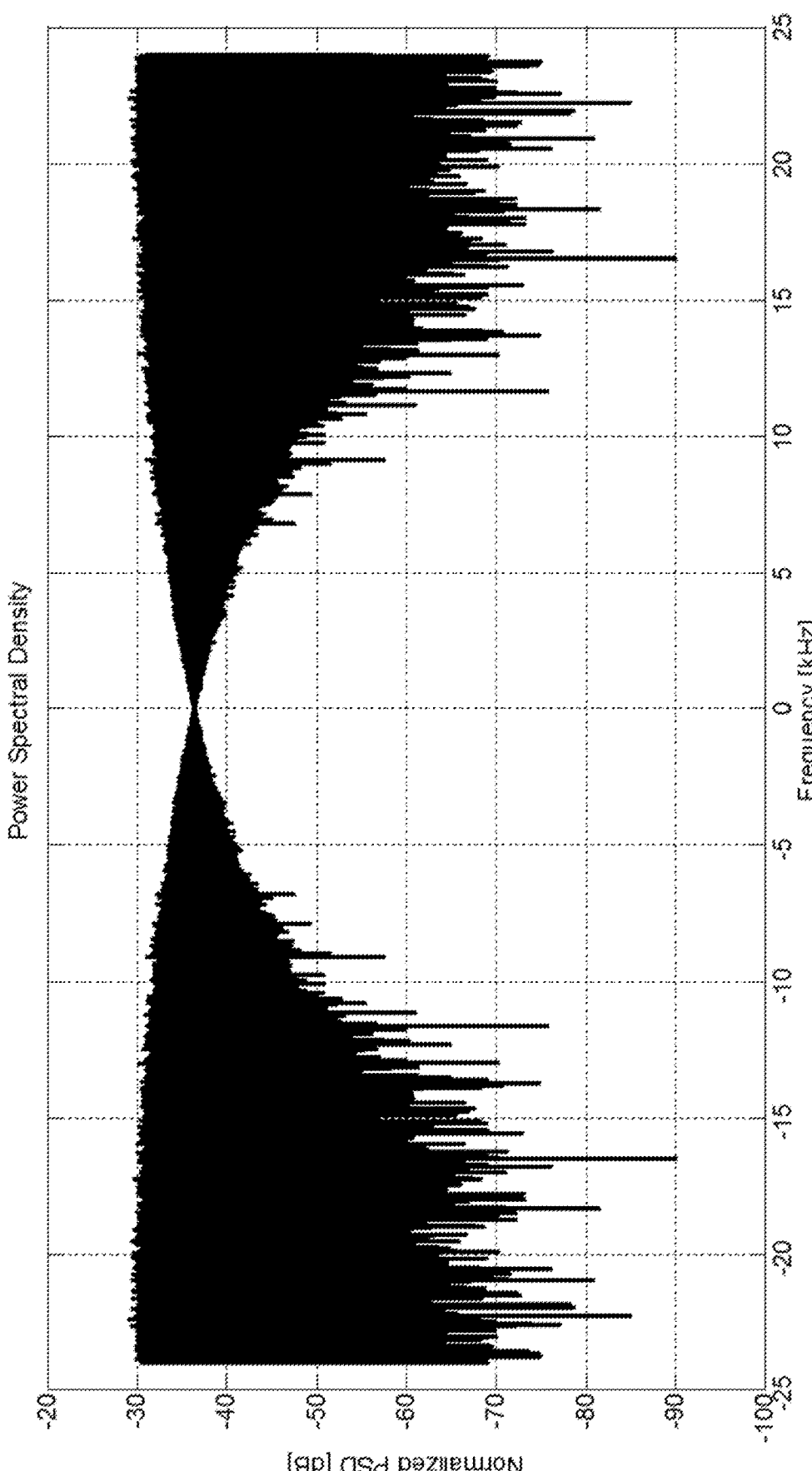
FIG. 8 is a power spectral density spectrum of a baseband signal used to generate a ranging signal according to an embodiment.

The concept of a multiple subband signal time of arrival estimation will be illustrated by means of an example and some simulation results implemented at low frequencies in baseband. The (U)WB signal is represented by a pseudo-noise (PN) DS-SS signal. This signal is generated using a maximum length (ML) sequence of length $2^{19}-1$ and a chip rate of $R_c=48$ kHz, which is taken equal to the sample rate $f_s$ in this simulation. The double sided baseband spectrum for $$-\frac{f_s}{2} < f < +\frac{f_s}{2}$$

is shown in FIG. 8.

Figures 10A, 10B:
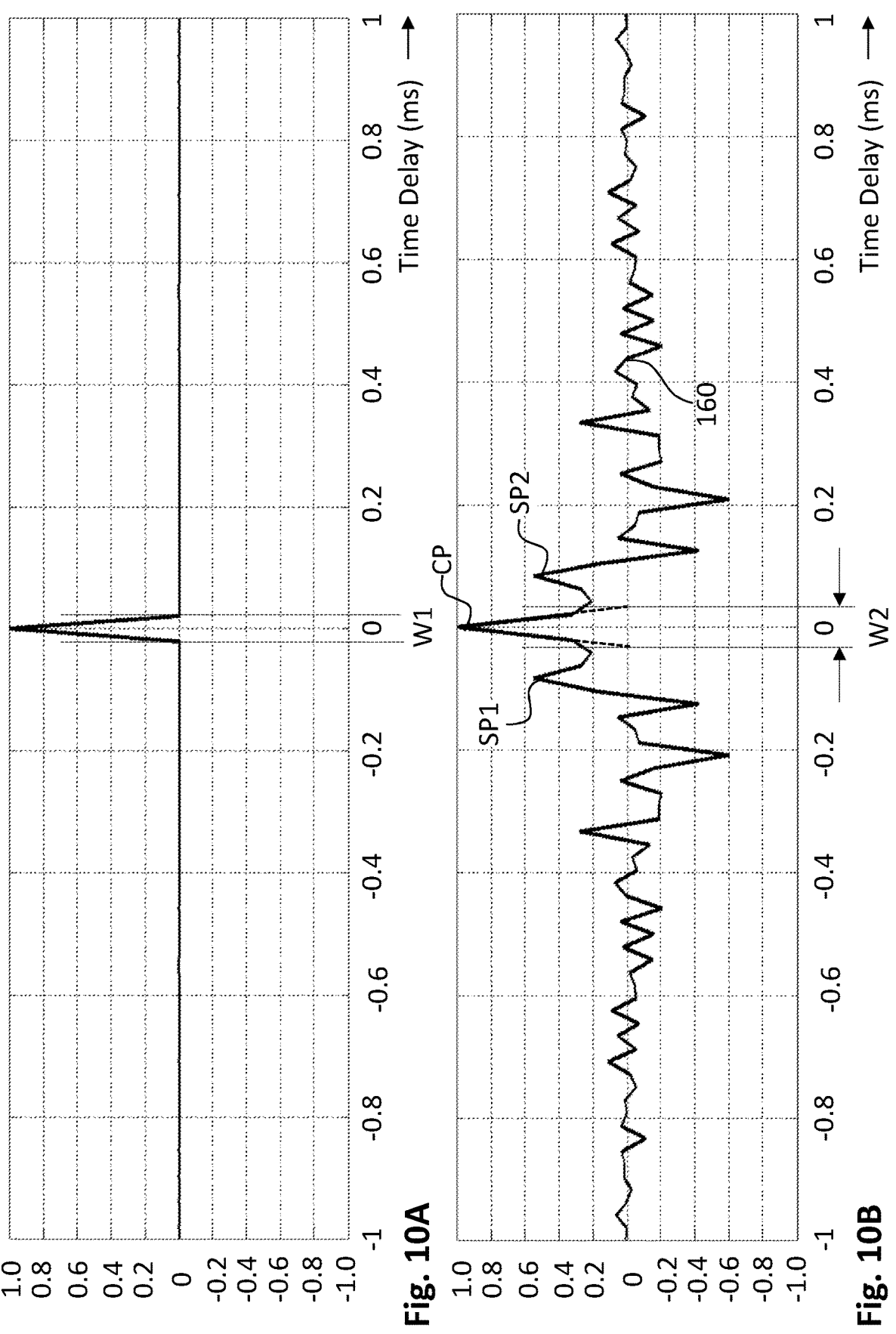
FIG. 10A shows the autocorrelation signal of the unfiltered signal the PSD spectrum of which unfiltered signal is shown in FIG. 8.
FIG. 10B shows the autocorrelation signal of a signal according to an embodiment.

When we determine the autocorrelation of this signal, as $$R_x(\tau) = F^{-1}\{P_x(f)\} = F^{-1}\{|\overline{X}(f)|^2\}, \tag{16}$$

with $\overline{X}(f)=\overline{C}(f)$, we get a real triangular pulse with a width, as expected, of $$\frac{2}{R_c},$$

as shown in FIG. 10A. In FIG. 10A, the width of the central peak is indicated by W1.

In the following step, we create a signal consisting of 3 subbands by filtering the DS-SS signal in the baseband domain with three $16^{th}$ order linear phase bandpass filters with the following arbitrary chosen parameters:

$$H_1(f): BW_1 = 2 \text{ kHz}, f_{a,1} = 12 \text{ kHz}$$

$$H_2(f): BW_2 = 3 \text{ kHz}, f_{a,2} = 2 \text{ kHz}$$

$$H_3(f): BW_3 = 1 \text{ kHz}, f_{a,3} = -21 \text{ kHz}$$

Figure 9:
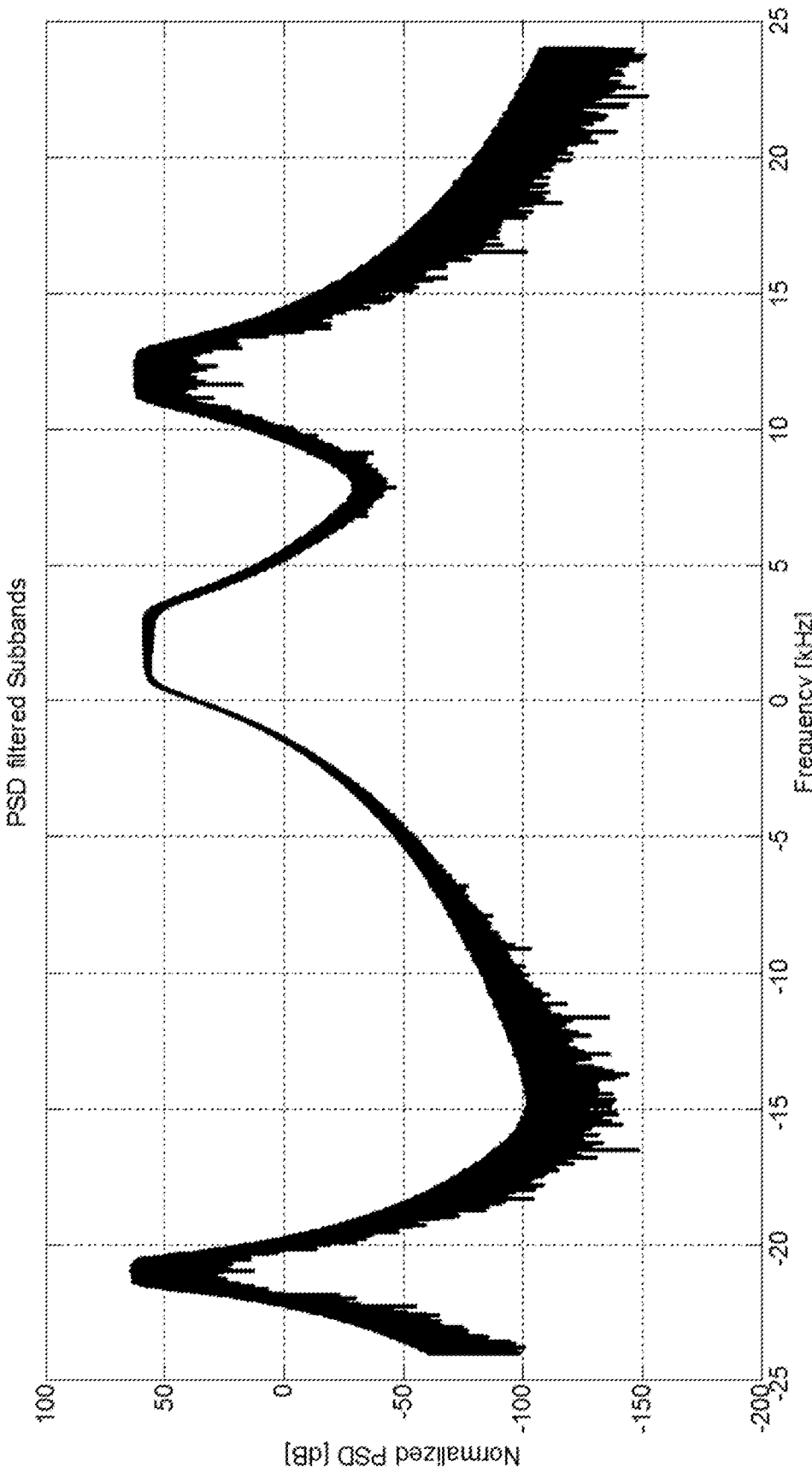
FIG. 9 shows the power spectral density of a signal according to an embodiment, in baseband.

For this specific case, we transmit only in a small fraction of the total bandwidth covered, namely $$BW_\% = \sum_{n=1}^{3} \frac{BW_n}{BW_{tot}} = \frac{6}{48} = 12\%$$

of the total bandwidth of the PN-signal. The individual subband signals $x_k(t)$ with $k=1, \ldots, 3$ are now found with (6). The PSD $|\overline{X}(f)|^2$ of the filtered baseband signal is shown in FIG. 9.

The autocorrelation function of this multi-subband signal can now be determined using (12) and (24). FIG. 10B shows the real part 160 of the autocorrelation function $$R_{x_k}(\tau) = F^{-1}\{|\overline{X}_k(f)|^2\}$$

of the total autocorrelation function $R_x(\tau)$. FIG. 10E shows the real part of the autocorrelation functions $$R_{x_k}(\tau) = F^{-1}\{|\overline{X}_k(f)|^2\}$$

of the individual signals $x_k(t)$.

The center correlation peak of the autocorrelation function of the signal as transmitted having the three signal components respectively centered at −21 kHz, 2 kHz and 12 kHz as per above, i.e. the center correlation peak CP in FIG. 10B, is as narrow as the peak of the autocorrelation function would be of a signal occupying the entire frequency range from −21.5 kHz to 13 kHz. The width of the total CF peak at time delay $\tau=0$ is determined by the overall bandwidth spanned by the subbands' spectra ($f_{max}$–$f_{min}$). In this case $$BW_x = f_{\alpha_1} - f_{\alpha_3} + \frac{BW_1 + BW_3}{2} = 34.5$$

kHz; the width of the main peak CP at time displacement $\tau=0$ is about 0.062 ms close to $$\frac{2}{BW_x} = 0.058 \text{ ms.}$$

The width of the central peak CP in FIG. 10B is indicated by W2. All side peaks in the autocorrelation signal depicted in FIG. 10B, including side peak SP1 and side peak SP2, have a height lower than 0.6 whereas the central peak CP has a height of 1.0. The $\tau$-range over which (side) peaks occur is determined by the bandwidths of the subbands, the narrower the subbands $BW_k$, the less confined are the peaks in the correlation function (CF). The ACF $R_x(\tau)$ can be optimized by properly choosing the subband signals.

A comparison between FIGS. 10A and 10B learns that the central peak of the autocorrelation function of the filtered baseband signal is shown in FIG. 9, which is a signal according to an embodiment, is almost as wide as the central peak of the autocorrelation function of the unfiltered signal shown in FIG. 8 that spans the entire frequency range from −24 kHz to +24 kHz.

Figures 10C, 10D:
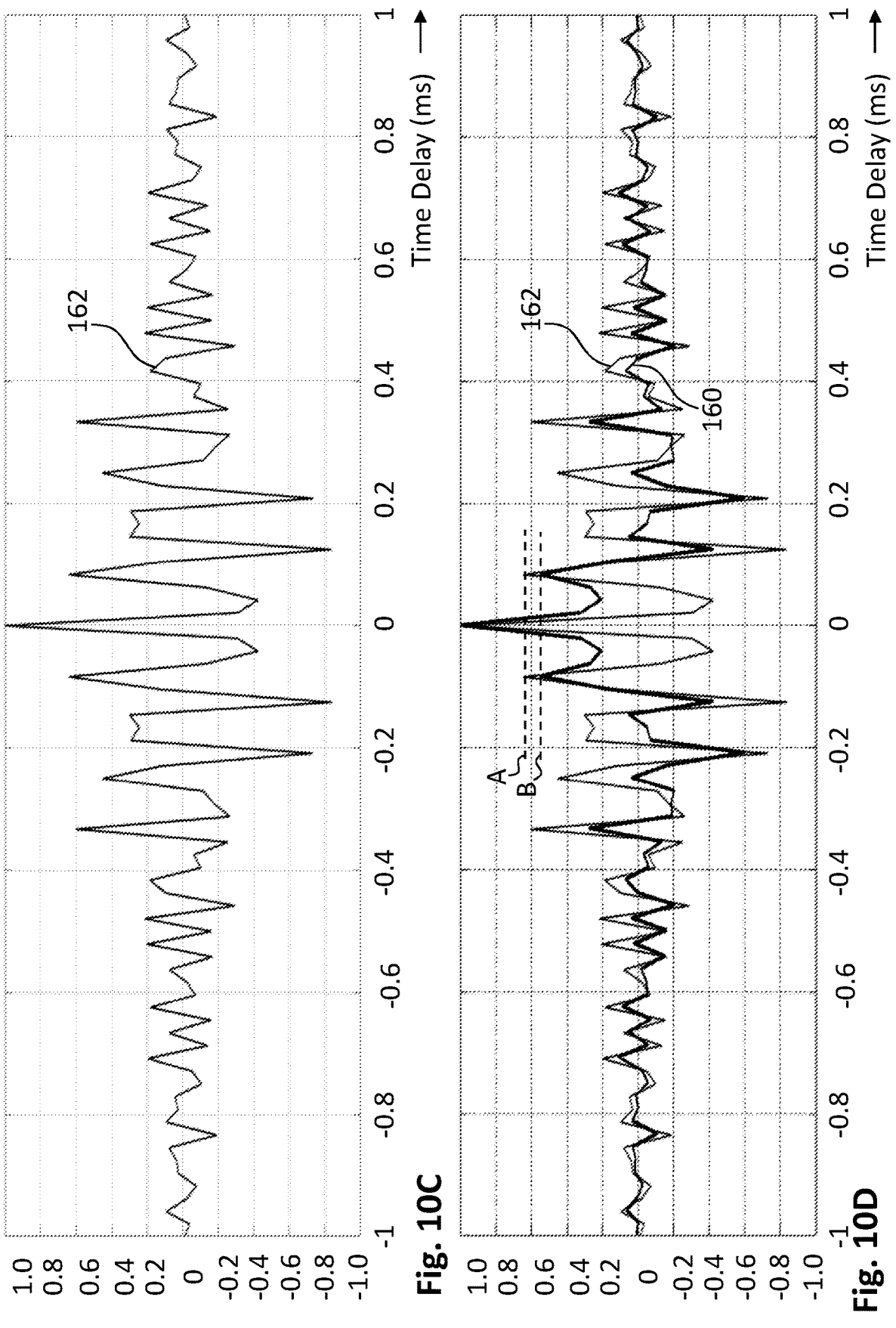
FIG. 10C shows the autocorrelation signal of a signal having two signal components.
FIG. 10D shows a comparison between the autocorrelation signals shown respectively in FIG. 10B and FIG. 10C.
Figure 10E:
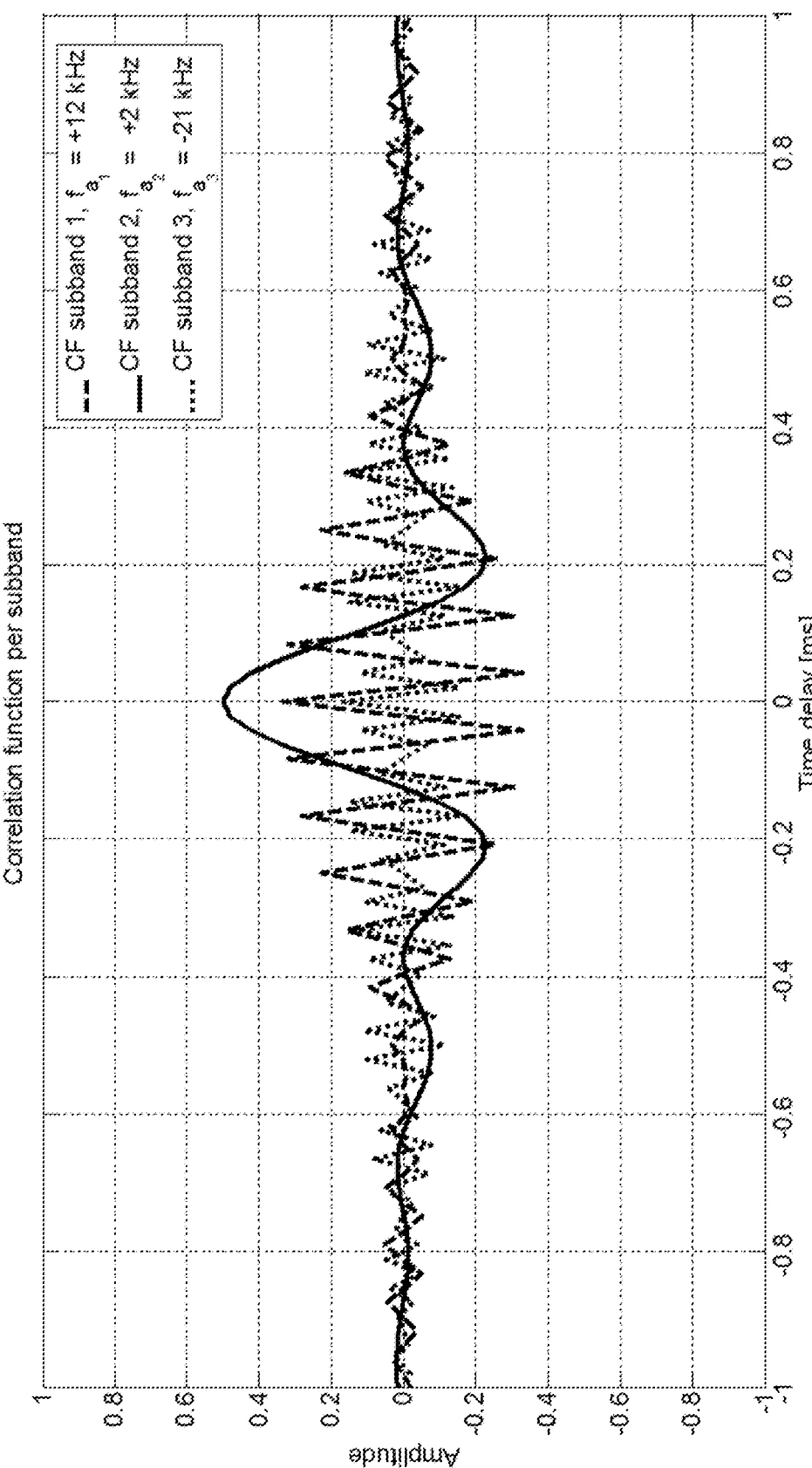
FIG. 10E shows the autocorrelation signal components forming the signal of FIG. 10B.

FIG. 10C shows the real part of the autocorrelation function 162 of a further signal that is the same as the signal of which the power spectrum is shown in FIG. 9 with the only difference that this further signal does not comprise the central signal component at 2 kHz. This further signal does comprise the signal components centered at −21 kHz and +12 kHz as shown in FIG. 9.

FIG. 10D shows both the real part of the autocorrelation function 160 of FIG. 10B, associated with a signal having three signal components, and the real part of the autocorrelation function 162 of FIG. 10C, associated with a signal having two signal components, in one plot. Clearly, all side peaks of the autocorrelation function 160 are lower than the side peaks of autocorrelation function 162. In particular, autocorrelation function 162 has two side peaks on either side of the central peak which have a height A as indicated, whereas for autocorrelation function 160 these two side peaks have a height B lower than A. It should be understood that the lower these side peaks are, the smaller the chance that such a side peak is mistaken for the central peak, which would yield inaccurate time of arrival measurements. Hence, the more signal components are present, the more accurate the time of arrival measurement.

Figure 10F:
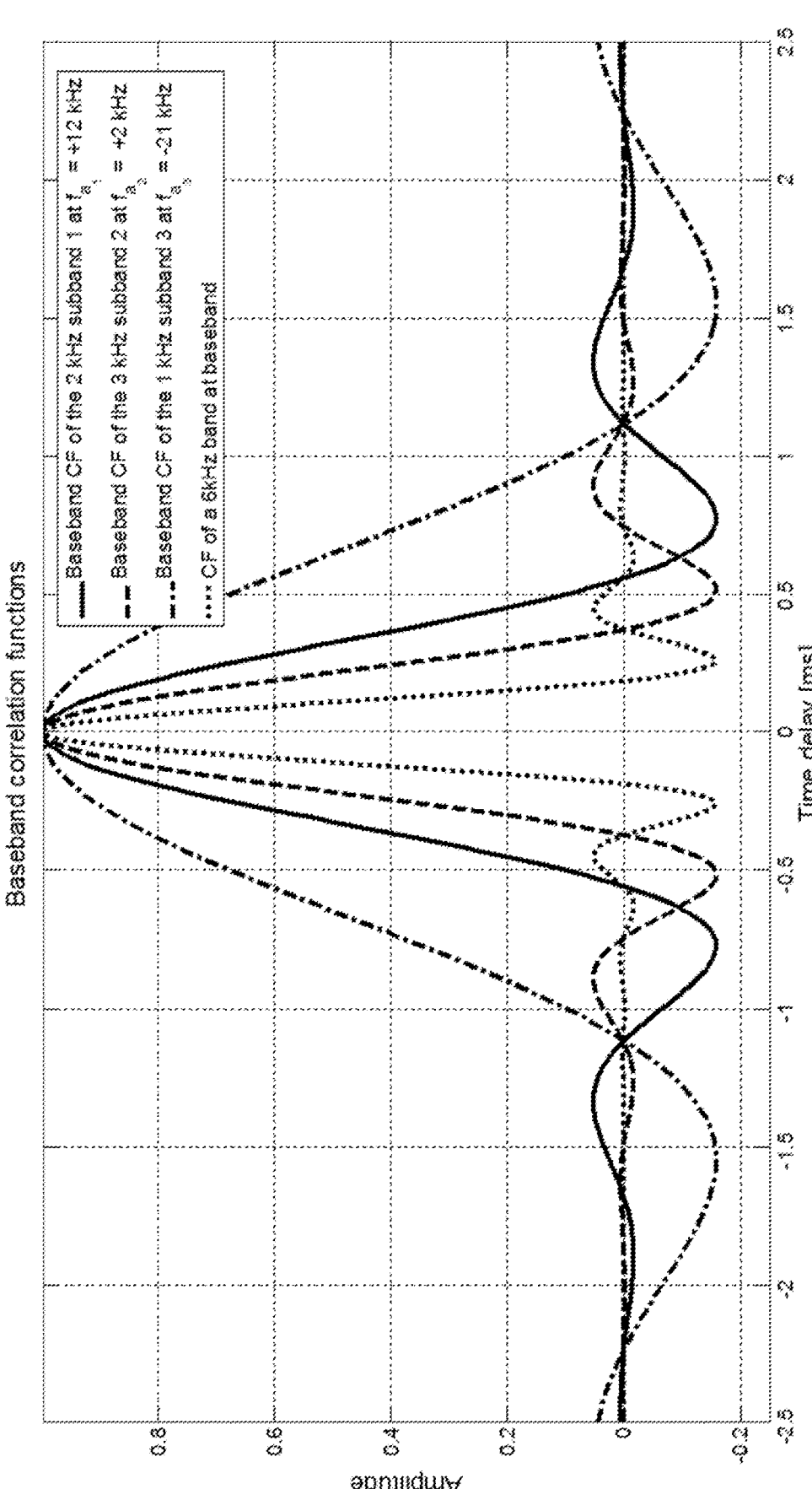
FIG. 10F shows a comparison of correlation signals in baseband.

FIG. 10F shows a comparison between the correlations of the individual subband signals with a bandwidth of 1, 2 and 3 kHz and a single band signal with the same total bandwidth of 6 kHz of all the subbands summed together. The 6 kHz bandwidth signals clearly shows the best resolution, with a correlation pulse width of about 0.37 ms, which however is almost a factor 6 larger than the pulse width of the multiband signal shown in FIG. 10B. This corresponds nicely with the ratio of the overall bandwidth of the signals $$\frac{34.5}{6} = 5.78.$$

Next, the impulse response of a multipath channel is estimated using the multiple subband signal s(t), as given by eqn. (1). In case of a multipath channel with L discrete paths, the channel impulse response (CIR) can be modeled as:

$$h_c(t) = \sum_{l=0}^{L-1} a_l \delta(t - \tau_l), \tag{17}$$

with $a_l$ and $\tau_l$ the amplitude and time delay of the $l^{th}$ multipath component of $h_c(t)$, respectively. Without loss of generality, we can set $\tau_0=0$, typically with $l=0$ indicating the first arriving path. In a noisy channel, the received signal can now be written as $$r(t) = s(t) * h_c(t) + n(t) = \sum_{l=0}^{L-1} a_l s(t - \tau_l) + n(t). \tag{18}$$

where * indicates convolution. Since the transmitted signal is known, the received signal r(t) can be correlated with this reference template s(t). This cross-correlation $\langle r(t)s(t+\tau)\rangle$ is given by $$R_{rs}(\tau) = \langle r(t)s(t+\tau)\rangle \tag{19}$$

$$= \langle [s(t) * h_c(t) + n(t)]s(t+\tau)\rangle$$

$$= \langle [s(t) * h_c(t)]s(t+\tau)\rangle + \langle n(t)s(t+\tau)\rangle$$

$$= R_{s_{mp}s} + R_{ns}.$$

where $R_{s_{mp}s}$ is the cross-correlation between the signal template and the received multipath signal and $R_{ns}$ is the cross-correlation between the signal template and the received noise. For $R_{s_{mp}s}$ we can derive:

$$R_{s_{mp}s}(\tau) = \langle [s(t) * h_c(t)]s(t+\tau)\rangle \tag{20}$$

$$= \left\langle \sum_{l=0}^{L-1} a_l s(t - \tau_l)s(t+\tau)\right\rangle$$

$$= \sum_{l=0}^{L-1} a_l \langle s(t - \tau_l)s(t+\tau)\rangle$$

$$= \sum_{l=0}^{L-1} a_l \langle s(t_l')s(t_l' + \tau + \tau_l)\rangle$$

$$= \sum_{l=0}^{L-1} a_l R_s(\tau + \tau_l),$$

where $t_l' = t - \tau_l$ and $R_s(\tau) = \langle s(t)s(t+\tau)\rangle$ is used. Since the PSD of s(t) is $P_s(f) = F\{R_s(\tau)\}$, it follows that $F\{R_s(\tau + \tau_l)\} = P_s(f)e^{j2\pi f \tau_l}$ and thus $$P_{s_{mp}s}(f) = F\{R_{s_{mp}s}(\tau)\} \tag{21}$$

$$= \sum_{l=0}^{L-1} a_l F\{R_s(\tau + \tau_l)\}$$

$$= \sum_{l=0}^{L-1} a_l P_s(f)e^{j2\pi f \tau_l}$$

$$= P_s(f)\sum_{l=0}^{L-1} a_l e^{j2\pi f \tau_l}$$

$$= P_s(f)H_c(f)$$

where $H_c(f) = F\{h_c(t)\}$ using (17). Now an estimate of the CIR is found as $h_c(t) =$ $$F^{-1}\left\{\frac{F\{R_{rs}(\tau)\}}{P_s(f)}\right\}.$$

Care needs to be taken of noise enhancement due to frequency components where $P_s(f) \to 0$ (nearly a divide-by-zero).

An alternative signal description, often used in the signal processing community, is the following. Again the received signal is given by eqn. (3). In the frequency domain this becomes:

$$R(f) = F\{r(t)\} = S(f)H_c(f) + N(f). \tag{22}$$

Since the signal s(t) and thus S(f) is known, an estimate of the CIR can be determined as $$h_c(t) = F^{-1}\{R(f)/S(f)\} = F^{-1}\{H_c(f) + N(f)/S(f)\}. \tag{23}$$

Again care needs to be taken of noise enhancement due to frequency components where $S(f) \to 0$.

At the receiver device, preferably, the subbands are retrieved separately by means of down-conversion to baseband signals. If it is assumed that frequency and phase are perfectly calibrated at the transmitter device, thus that errors only occur at the receiver device, and that at the receiver device a perfect reference signal $$x_k^{bb}(t)$$

for the $k^{th}$ subband signal is present, then the impact of frequency errors and phase errors in the local oscillator signal of the receiver device on the retrieved autocorrelation function of the $k^{th}$ subband signal as given by eqn. (14) may be analyzed as follows. If a frequency error $\Delta f_{a_k}$ and phase error $\Delta\theta_{a_k}$ are introduced, then eqn. (14) becomes:

$$R_{x_k}(\tau) = \langle x_k^*(t)x_k(t+\tau, \Delta f_{a_k}, \Delta\theta_{a_k})\rangle \tag{24}$$

$$= \langle (x_k^{bb})^*(t)e^{-j2\pi f_{ak} \cdot t}x_k^{bb}(t+\tau)e^{j(2\pi(f_{a_k} + \Delta f_{a_k})(t+\tau) + \Delta\theta_{a_k})}\rangle$$

$$= \langle (x_k^{bb})^*(t)x_k^{bb}(t+\tau)e^{j(2\pi(f_{a_k}\tau + \Delta f_{a_k}(t+\tau)) + \Delta\theta_{a_k})}\rangle.$$

The term $\Delta f_{a_k}t$ in the exponent will cause the correlation to go to zero, i.e. accurate frequency synchronization to $f_{a_k}$ is required. Note that the differences between the RF center frequencies $f_{c_k}$, and thus $f_{a_k}$ are known at the receiver device, which can be exploited in the synchronization process. Since the ranging signal will usually be a periodically transmitted short symbol sequence, a small frequency error, e.g. due to doppler shift, may effectively be observed as a random nearly constant carrier phase shift over the duration of the sequence. If perfect frequency synchronization of the receiver device to the subband center frequencies is assumed, then the correlation becomes:

$$R_{x_k}(\tau) = \langle x_k^*(t)x_k(t+\tau, \Delta\theta_{a_k})\rangle \tag{25}$$

$$= \langle (x_k^{bb})^*(t)e^{-j2\pi f_{a_k} t}x_k^{bb}(t+\tau)e^{j(2\pi(f_{a_k} + \Delta\theta_{a_k}))}\rangle$$

$$= \langle (x_k^{bb})^*(t)x_k^{bb}(t+\tau)e^{j(2\pi(f_{a_k}\tau + \Delta\theta_{a_k}))}\rangle$$

$$= R_{x_k^{bb}}(\tau)e^{j(2\pi f_{a_k}\tau + \Delta\theta_{a_k})},$$

i.e. an additional random phase shift per subband signal is obtained. In practice, several phenomena may result in a phase error $\Delta\theta_{a_k}$, like a phase mismatch in the receiver device, reflections in the channel or the use of different antenna phase centers for the transmission of the different subband signals. In general, unknown phase relation can be assumed between the received subband components. So for each multipath component the same delay is expected but a different unknown phase for each subband signal. Therefore, the complex equivalent channel impulse response for the $k^{th}$ subband signal can be defined as:

$$h_c(t, k) = \sum_{l=0}^{L-1} a_{l,k}\delta(t - \tau_l), \tag{26}$$

in which the complex valued $a_{l,k}=|a_{l,k}|e^{j\varphi l,k}$. Thus the multipath delays are assumed equal across the subbands, however, the amplitudes may vary from subband to subband. The subband dependent path amplitudes reflect the frequency dependent CIR that is found in practice at larger frequency separations (see e.g. D. W. Matolak, "Modeling the vehicle-to-vehicle propagation channel: A review", 2014 American Geophysical Union, pp. 721-736, August 2014, doi:10.1002/2013RS005363). Using eqn. (14), the cross-correlation in baseband of the received multiband signal from a multipath channel can now be written as:

$$R_{x_{mp}}(\tau) = \langle [x(t) * h_c(t)]^* x(t+\tau) \rangle \qquad (27)$$

$$= \left\langle \sum_{l=0}^{L-1} a_l x^*(t-\tau_l) x(t+\tau) \right\rangle$$

$$= \sum_{l=0}^{L-1} a_l \langle x^*(t-\tau_l) x(t+\tau) \rangle$$

$$= \sum_{l=0}^{L-1} \sum_{k=1}^{K} a_{l,k} R_{x_k}^{bb}(\tau+\tau_l) e^{2\pi j f_{a_k}(\tau+\tau_l)}$$

$$= \sum_{l=0}^{L-1} \sum_{k=1}^{K} |a_{l,k}| R_{x_k}^{bb}(\tau+\tau_l) e^{j(2\pi f_{a_k}(\tau+\tau_l)+\phi_{l,k})}.$$

Now the complex amplitude $a_{l,k}$ of the $l^{th}$ path depends on the center frequency $f_{a_k}$, i.e. its amplitude and phase are frequency dependent.

In the following some results are shows that have been obtained by simulation of the retrieved multipath channel impulse response from a multiple subband signal that has propagated through such a multipath channel. The complex equivalent baseband signal with noise of the received multiple subband signal after multipath propagation can be written as $$r_{bb}(t) = x(t) * h_c(t, k) + n(t) = \qquad (28)$$

$$= \left\{ \sum_{k=1}^{K} x_k(t) \right\} * h_c(t, k) + n(t)$$

$$= \sum_{k=1}^{K} \sum_{l=0}^{L-1} a_{l,k} x_k(t-\tau_l) + n(t)$$

$$= \sum_{k=1}^{K} \sum_{l=0}^{L-1} a_{l,k} e^{j2\pi f_{a_k}\tau} x_k^{bb}(t-\tau_l) e^{j2\pi f_{a_k}t} + n(t),$$

with $a_{l,k}=|a_{l,k}|e^{j\varphi l,k}$ is the $l^{th}$ path amplitude for the $k^{th}$ subband, which allows CIR distortion for the different subbands. The noise term $n(t)$ consists of bandpass filtered noise covering the subbands only, the PSD of whish is given by $$P_n(f) = N_0 \sum_{k=1}^{K} |H_k(f-f_{a_k})|^2). \qquad (29)$$

The subband signals $x_k(t)$ and subband filters $H_k(f)$ with center frequencies $f_{a_k}$ used, are those as specified in (2)-(6). The signal-to-noise ratio is then defined as $$SNR = \frac{P_{signal}}{P_{noise}} = \frac{\int_{-f_s/2}^{f_s/2} |\tilde{X}(f)|^2 |H_c(f)|^2 df}{\int_{-f_s/2}^{f_s/2} P_n(f) df}. \qquad (30)$$

The CIR of the multipath channel is estimated using deconvolution in the frequency domain as given by eqn. (23):

$$\hat{h}_c(t) = F^{-1}\{R_{bb}(f)/X(f)\} \qquad (31)$$

$$= F^{-1}\{H_c(f) + N(f)/X(f)\},$$

where $$X(f) = F\{x(t)\} = F\left\{ \sum_{k=1}^{K} x_k(t) \right\}$$

is the known signal template at the receiver device. As indicated before, since we divide by X(f), blowing up the noise at frequency components where X(f) is small should be prevented. This is done by setting the frequency components of the numerator to zero for which $$\frac{|X(f)|}{\max\{|X(f)|\}} < \epsilon.$$

Values for $\epsilon$ between $10^{-5}$-$10^{-15}$ perform reasonably well. In the following, a 4-path channel with variation across the subbands is observed:

$$\text{path delays: } \tau = [0 \ 0.0625 \ 2 \ 4] \cdot 10^{-3}$$

$$\text{path amplitudes: } a_{l,1} = [1 \ 0.8 \ 0.5 \ 0.25]$$

$$\text{path phases: } \phi_{l,1} = \left[0 \ \frac{\pi}{2} \ \pi \ \frac{3\pi}{4}\right]$$

$$\text{path amplitudes: } a_{l,2} = [1.2 \ 1.0 \ 0.6 \ 0.3]$$

$$\text{path phases: } \phi_{l,2} = \left[\frac{\pi}{4} \ \frac{\pi}{2} \ \pi \ \frac{pi}{8}\right]$$

$$\text{path amplitudes: } a_{l,3} = [0.8 \ 0.7 \ 0.4 \ 0.2]$$

$$\text{path phases: } \phi_{l,3} = \left[\frac{\pi}{8} \ \frac{\pi}{3} \ \pi \ \frac{\pi}{5}\right]$$

Figure 11:
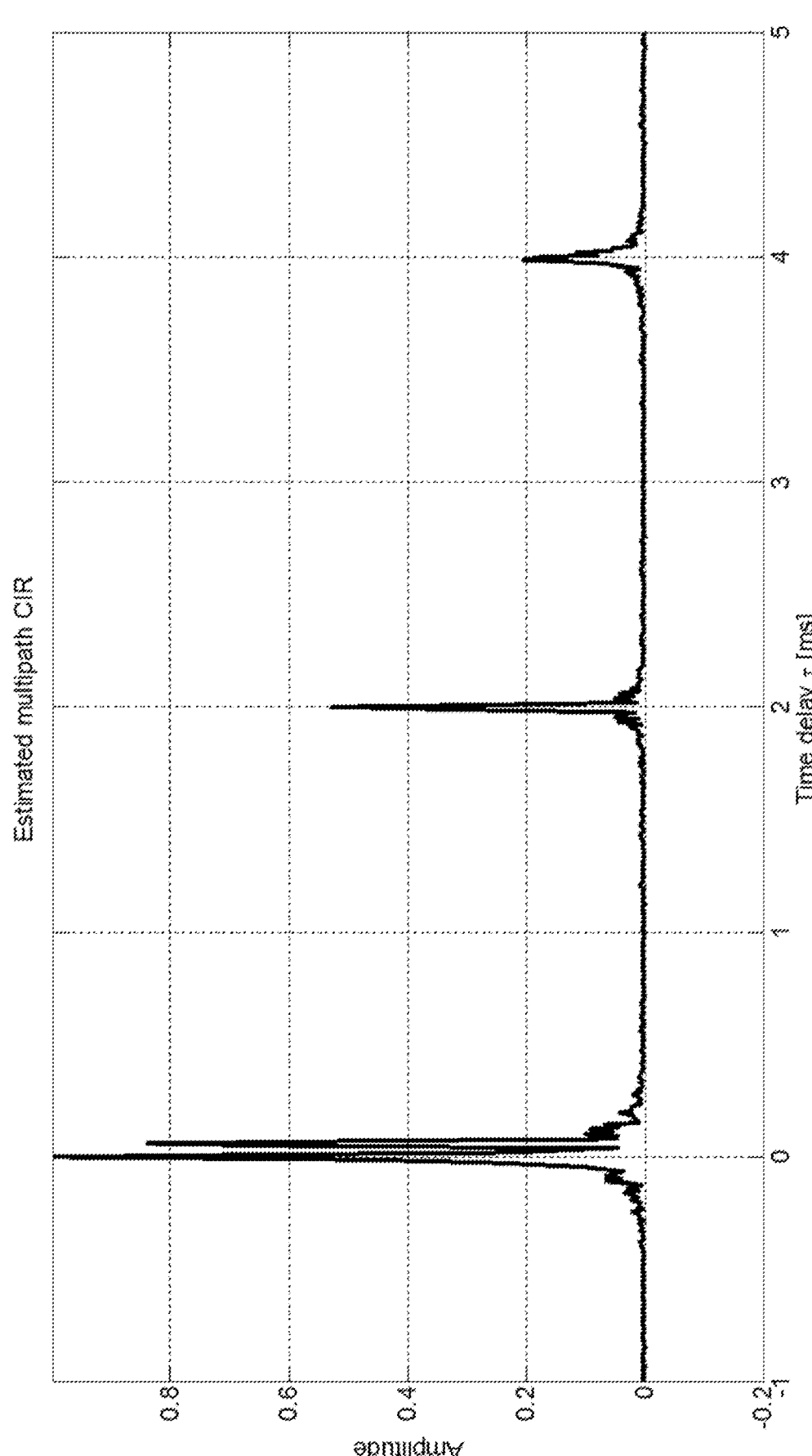
FIG. 11 shows an estimated 4-path channel impulse response.

FIG. 11 shows the estimated channel impulse response for a channel with variation across the subbands, signal-to-noise ratio SNR=10 dB and $\epsilon=10^{-10}$. The retrieved CIR remains good even when quite a lot of noise is present, which shows the robustness of this deconvolution method. For low SNR values, a lower value of E may need to be selected to reduce the blowing-up effect in the deconvolution.

Figure 12:
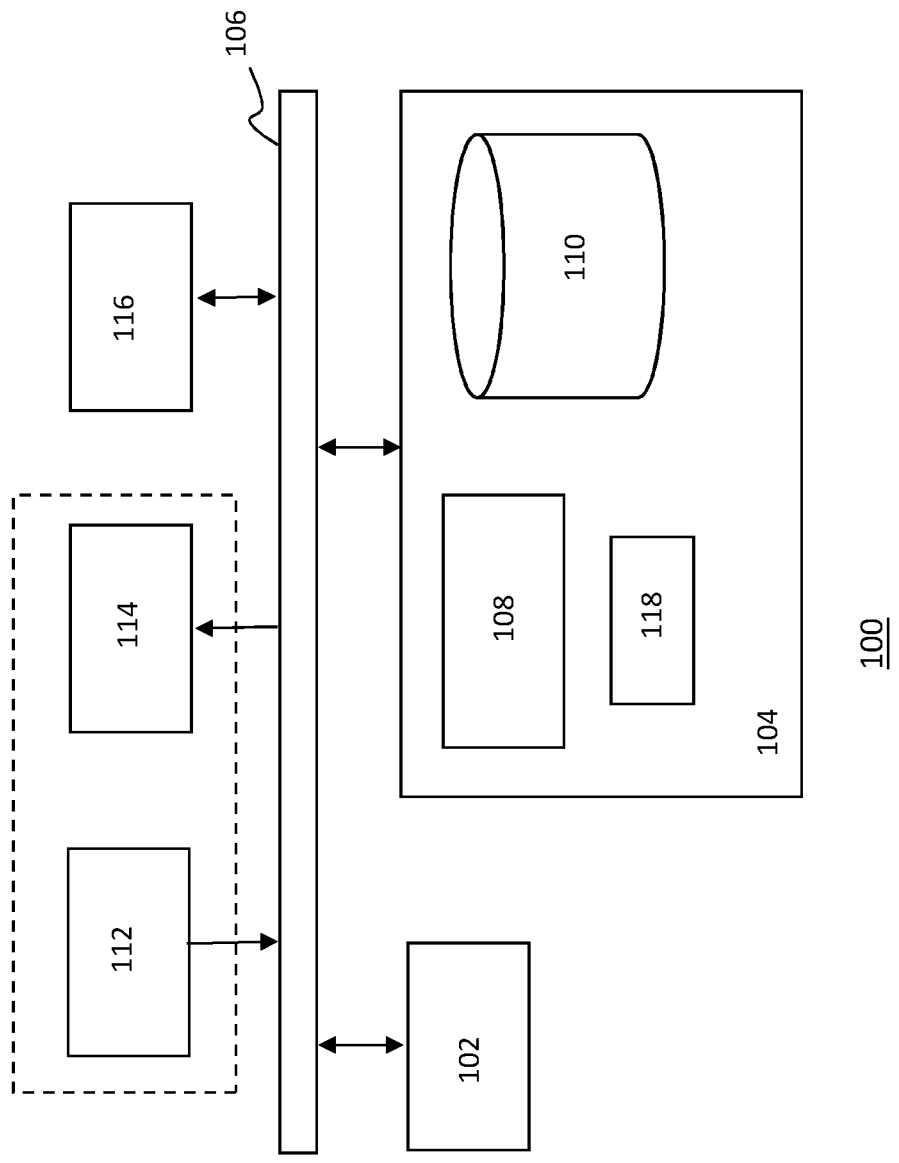
FIG. 12 shows a data processing system according to an embodiment.

FIG. 12 depicts a block diagram illustrating an exemplary data processing system.

As shown in FIG. 12, the data processing system 100 may include at least one processor 102 coupled to memory elements 104 through a system bus 106. As such, the data processing system may store program code within memory elements 104. Further, the processor 102 may execute the program code accessed from the memory elements 104 via a system bus 106. In one aspect, the data processing system may be implemented as a computer that is suitable for storing and/or executing program code. It should be appreciated, however, that the data processing system 100 may be implemented in the form of any system including a processor and a memory that is capable of performing the functions described within this specification.

The memory elements 104 may include one or more physical memory devices such as, for example, local memory 108 and one or more bulk storage devices 110. The local memory may refer to random access memory or other non-persistent memory device(s) generally used during actual execution of the program code. A bulk storage device may be implemented as a hard drive or other persistent data storage device. The processing system 100 may also include one or more cache memories (not shown) that provide temporary storage of at least some program code in order to reduce the number of times program code must be retrieved from the bulk storage device 110 during execution.

Input/output (I/O) devices depicted as an input device 112 and an output device 114 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 12 with a dashed line surrounding the input device 112 and the output device 114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 116 may also be coupled to the data processing system to enable it to become coupled to other systems, computer systems, remote network devices, and/or remote storage devices through intervening private or public networks. The network adapter may comprise a data receiver device for receiving data that is transmitted by said systems, devices and/or networks to the data processing system 100, and a data transmitter device for transmitting data from the data processing system 100 to said systems, devices and/or networks. Modems, cable modems, and Ethernet cards are examples of different types of network adapter that may be used with the data processing system 100.

As pictured in FIG. 12, the memory elements 104 may store an application 118. In various embodiments, the application 118 may be stored in the local memory 108, the one or more bulk storage devices 110, or apart from the local memory and the bulk storage devices. It should be appreciated that the data processing system 100 may further execute an operating system (not shown in FIG. 12) that can facilitate execution of the application 118. The application 118, being implemented in the form of executable program code, can be executed by the data processing system 100, e.g., by the processor 102. Responsive to executing the application, the data processing system 100 may be configured to perform one or more operations or method steps described herein.

In another aspect, the data processing system 100 may represent a client data processing system. In that case, the application 118 may represent a client application that, when executed, configures the data processing system 100 to perform the various functions described herein with reference to a "client". Examples of a client can include, but are not limited to, a personal computer, a portable computer, a mobile phone, or the like.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 102 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. Method for determining a signal's time of arrival at a receiver device, the signal being transmitted by a transmitter device to the receiver device, the method comprising:
correlating the signal as transmitted by the transmitter device and the signal as received by the receiver device with each other, wherein the transmitter device is a base station of a mobile communication system, wherein the signal comprises in its frequency spectrum:
a first signal component spanning a first frequency range,
a second signal component spanning a second frequency range, and
a third signal component spanning a third frequency range, wherein
the first frequency range and second frequency range are separated by an intermediate frequency range that does not contain a signal component of the signal, and
the second frequency range and third frequency range are separated by a second intermediate frequency range that does not contain a signal component of the signal, wherein a lowest frequency present in the signal and a highest frequency present in the signal are separated by a frequency range of at least 250 MHz wide, and the method comprising determining said time of arrival based on the performed correlation.

2. The method according to claim 1, further comprising based on the determined time of arrival, determining a distance between the transmitter device and the receiver device.

3. The method according to claim 1, wherein an autocorrelation function of the signal as transmitted comprises a central peak of a first height at zero time displacement and one or more side peaks at nonzero time displacements, wherein all side peaks of the autocorrelation function are lower than 0.9 times the first height, preferably lower than 0.8 times the first height, more preferably lower than 0.7 times the first height, most preferably lower than 0.6 times the first height.

4. The method according to claim 1, wherein the lowest frequency present in the signal and the highest frequency present in the signal are separated by a frequency range of at least 500 MHz wide.

5. The method according to claim 1, wherein the first frequency range has a center frequency $f_{c_1}$ and the second frequency range has a center frequency $f_{c_2}$ and the third frequency range has a center frequency $f_{c_3}$, and wherein correlating the signal as transmitted and the signal as received with each other comprises:

obtaining a down-converted first signal component as received obtainable by down-converting the first signal component as received over a first frequency shift range, the down-converted first signal component as received having a center frequency $f_{c_3\downarrow}$, obtaining a down-converted second signal component as received obtainable by down-converting the second signal component as received over a second frequency shift range, the down-converted second signal component as received having a center frequency $f_{c_2\downarrow}$, obtaining a down-converted third signal component as received obtainable by down-converting the third signal component as received over a third frequency shift range, the down-converted third signal component as received having a center frequency $f_{c_3\downarrow}$, and correlating the down-converted first signal component as received and a down-converted first signal component as transmitted with each other in order to determine a first correlation signal, wherein the down-converted first signal component as transmitted is obtainable by down-converting the first signal component as transmitted over the first frequency shift range, and the first correlation signal has a center frequency $f_{c_3corr}$, correlating the down-converted second signal component as received and a down-converted second signal component as transmitted with each other in order to determine a second correlation signal, wherein the down-converted second signal component as transmitted is obtainable by down-converting the second signal component as transmitted over the second frequency shift range, and the second correlation signal has a center frequency $f_{c_2,corr}$, correlating the down-converted third signal component as received and a down-converted third signal component as transmitted with each other in order to determine a third correlation signal, wherein the down-converted third signal component as transmitted is obtainable by down-converting the third signal component as transmitted over the third frequency shift range, and the third correlation signal has a center frequency $f_{c_3,corr}$, frequency shifting the first correlation signal, the frequency shifted first correlation signal having a center frequency $f_{c_1,corr,shifted}$, frequency shifting the second correlation signal, the frequency shifted second correlation signal having a center frequency $f_{c_2,corr,shifted}$, and frequency shifting the third correlation signal, the frequency shifted third correlation signal having a center frequency $f_{c_3,corr,shifted}$, such that $$(f_{c_1,\downarrow} - f_{c_1}) + (f_{c_1,corr,shifted} - f_{c_1,corr}) =$$
$$(f_{c_2,\downarrow} - f_{c_2}) + (f_{c_2,corr,shifted} - f_{c_2,corr}) =$$
$$(f_{c_3,\downarrow} - f_{c_3}) + (f_{c_3,corr,shifted} - f_{c_3,corr}), \text{ and}$$

summing the frequency shifted first, second and third correlation signals.

6. The method according to claim 1, wherein correlating the signal as transmitted by the transmitter device and the signal as received by the receiver device with each other comprises determining a correlation in accordance with $$R_x(\tau) = \sum_{k=1}^{K} R_{x_k^{bb}}(\tau) e^{j2\pi f_{c_k}\tau},$$

wherein $$j = \sqrt{-1},$$

the $k^{th}$ signal component of the signal is described by $$\mathrm{Re}\{x_k^{bb}(t) e^{j2\pi f_{c_k}t}\},$$

the signal as transmitted by $$s_t(t) = \sum_{k=1}^{K} \mathrm{Re}\{x_{k,t}^{bb}(t) e^{j2\pi f_{c_k}t}\},$$

the signal as received by $$s_r(t) = \sum_{k=1}^{K} \mathrm{Re}\{x_{k,r}^{bb}(t) e^{j2\pi f_{c_k}t}\},$$

the $k^{th}$ signal component of the signal spans a frequency range having $f_{c_k}$ as center frequency, and $$R_{x_k^{bb}}(\tau) = \langle (x_{k,r}^{bb})^*(t)(x_{k,t}^{bb})(t+\tau)\rangle,$$

where <.> denoted averaged over time, and wherein $$f_{a_k} = f_{c_k} - f_c,$$

wherein $f_c$ is the center frequency of the signal as transmitted.

7. The method according to claim 1, comprising the receiver device receiving the signal from the transmitter device using one or more antennas.

8. A receiver device comprising:
one or more antennas for receiving a signal from a transmitter device; and
a data processing system including at least one processor configured to:
correlate the signal as transmitted by the transmitter device and the signal as received by the receiver device with each other, wherein the transmitter device is a base station of a mobile communication system, wherein the signal comprises in its frequency spectrum:
a first signal component spanning a first frequency range,
a second signal component spanning a second frequency range, and
a third signal component spanning a third frequency range, wherein
the first frequency range and second frequency range are separated by an intermediate frequency range that does not contain a signal component of the signal,
the second frequency range and third frequency range are separated by a second intermediate frequency range that does not contain a signal component of the signal;
wherein a lowest frequency present in the signal and a highest frequency present in the signal are separated by a frequency range of at least 250 MHz wide; and
determine the signal's time of arrival at the receiver device based on the performed correlation.

9. A method for transmitting a ranging signal, the method comprising:
transmitting the ranging signal by a transmitter device being a base station of a mobile communication system, wherein the ranging signal comprises in its frequency spectrum a first signal component spanning a first frequency range and a second signal component spanning a second frequency range and a third signal component spanning a third frequency range, the first frequency range and second frequency range being separated by a first intermediate frequency range that does not contain a signal component of the signal and the second frequency range and third frequency range being separated by a second intermediate frequency range that does not contain a signal component of the ranging signal, wherein a lowest frequency present in the signal and a highest frequency present in the signal are separated by a frequency range of at least 250 MHz wide.

10. A transmitter device being a base station of a mobile communication system, the transmitter device comprising a data processing system including at least one processor configured to perform the method of claim 9.

11. A non-transitory computer-readable medium comprising a computer program, the computer program comprising instructions which, when the program is executed by a data processing system, cause the data processing system to carry out the method according to claim 9.

12. A data processing system comprising at least one processor configured to perform the method according to claim 1.

13. A non-transitory computer-readable medium comprising a computer program, the computer program comprising instructions which, when the program is executed by a receiver device comprising at least one processor, cause the at least one processor to:
correlate a signal as transmitted by a transmitter device and the signal as received by the receiver device with each other, wherein the transmitter device is a base station of a mobile communication system, wherein the signal comprises in its frequency spectrum:
a first signal component spanning a first frequency range,
a second signal component spanning a second frequency range, and
a third signal component spanning a third frequency range, wherein
the first frequency range and second frequency range are separated by an intermediate frequency range that does not contain a signal component of the signal,
the second frequency range and third frequency range are separated by a second intermediate frequency range that does not contain a signal component of the signal,
wherein a lowest frequency present in the signal and a highest frequency present in the signal are separated by a frequency range of at least 250 MHz wide; and
determine the signal's time of arrival at the receiver device based on the performed correlation.

* * * * *